United States Patent
Takahashi et al.

(10) Patent No.: US 6,377,692 B1
(45) Date of Patent: Apr. 23, 2002

(54) METHOD AND SYSTEM FOR CONTROLLING KEY FOR ELECTRONIC SIGNATURE

(75) Inventors: Yoshio Takahashi; Hidemi Moribatake, both of Tokyo (JP)

(73) Assignees: NTT Data Corporation; Nippon Telegraph and Telephone Corporation, both of (JP)

( * ) Notice: Subject to any disclaimer, the term of this patent is extended or adjusted under 35 U.S.C. 154(b) by 0 days.

(21) Appl. No.: 09/142,929
(22) PCT Filed: Jan. 16, 1998
(86) PCT No.: PCT/JP98/00142
§ 371 Date: Mar. 11, 1999
§ 102(e) Date: Mar. 11, 1999
(87) PCT Pub. No.: WO98/32113
PCT Pub. Date: Jul. 23, 1998

(30) Foreign Application Priority Data

Jan. 17, 1997 (JP) .................................. 9-6810

(51) Int. Cl.$^7$ ................................................ H04K 1/04
(52) U.S. Cl. .................... 380/277; 380/279; 380/284
(58) Field of Search ............................. 380/277, 279, 380/284, 44

(56) References Cited

U.S. PATENT DOCUMENTS

| | | | |
|---|---|---|---|
| 4,868,877 A | * | 9/1989 | Fischer ........................ 713/157 |
| 4,918,728 A | * | 4/1990 | Matyas et al. ............... 380/280 |
| 4,941,176 A | * | 7/1990 | Matyas et al. ............... 380/280 |
| 5,091,942 A | * | 2/1992 | Dent ............................ 380/46 |
| 5,784,464 A | * | 7/1998 | Akiyama et al. ........... 713/155 |
| 5,915,025 A | * | 6/1999 | Taguchi et al. .............. 380/44 |
| 6,118,873 A | * | 9/2000 | Lotspiech .................... 380/277 |

FOREIGN PATENT DOCUMENTS

| | | |
|---|---|---|
| JP | 60-26387 | 2/1985 |
| JP | 60-95475 | 5/1985 |

* cited by examiner

Primary Examiner—Thomas R. Peeso
(74) Attorney, Agent, or Firm—Lerner, David, Littenberg, Krumholz & Mentlik, LLP

(57) ABSTRACT

Two keys which are updated in the same updating cycle at different times are prepared as signature keys (main key and auxiliary key) for electronic signature, and the updating cycle of each key is divided into, for example, three periods. The first and last periods after the updating are used for the auxiliary key while the intermediate period is used for the main key, and an electronic signature is carried out with the main key. The electronic signature is confirmed with either of two confirmation keys which are updated synchronously with updating the two keys used as the signature keys. This eliminates the need of stopping issuance of the electronic signature or limiting a service offer upon updating the signature keys.

48 Claims, 14 Drawing Sheets

METHOD AND SYSTEM FOR CONTROLLING KEY FOR ELECTRONIC SIGNATURE

TECHNICAL FIELD

The present invention relates to an electronic signature key control method which can update the contents of a key for electronic signature without limiting issuance of electronic signatures, an offer of various services based on the electronic signatures or the like, and to a system suitable for carrying out such a key control method.

Here, the electronic signature represents an electronic signature for proving the identity of a user by using a key peculiar to the user.

BACKGROUND ART

For example, in a party (or a society) where members are identified by membership cards, it is quite important for the running of the party to make it possible to mutually evaluate the legitimacy of the membership cards among the members. Recently, it has been attempted that a membership card is issued in the form of a high-security medium, such as an IC card, so as to be an electronic identification card which can be possessed only by a member, or issued as a member register certificate (electronic identification card) or an electronic ticket, which is difficult to be forged, using an electronic signature technique.

The member register certificate, the electronic ticket or the like (referred to as "member register certificate" for convenience in the following description) is required to make it possible not only to evaluate genuineness of the contents, but also to correctly confirm that a person using the member register certificate is a genuine member. Therefore, it has been carried out, using an electronic signature which can be produced only by the genuine member, to confirm whether the member register certificate is forged, or whether a person having the member register certificate is a right member.

In the electronic signature, an encryption technique based on a public key system is normally utilized. Specifically, a given member register organization executes electronic signatures using its own secret key (signature key), and distributes a public key (confirmation key) corresponding to the signature key to all the members. When authenticating the electronic signature, each member confirms the electronic signature using the confirmation key.

Since the confirmation key itself does not include information showing that it is a legitimate public key of the member register organization, it is necessary to confirm the legitimacy of the confirmation key separately in advance.

In the foregoing public key system, one of the grounds for security relies on the large calculation amount upon decoding. Accordingly, it leads to lowering of the security to continue using the same signature key and confirmation key over a long period of time, so that it is preferable to update each key at every given time period. Therefore, in general, it has been that the signature key can be updated periodically and, thereupon, each member can obtain the confirmation key updated synchronously with the updating of the signature key.

As a means for procuring the updated confirmation key, it is considered that the member register organization distributes the new confirmation key to all the members simultaneously. It is also considered to register the new confirmation key at a given public key certificate issuing center.

In the latter case, the public key certificate issuing center signs signature object data using its own secret key (center secret key) to obtain a public key certificate, and properly distributes this public key certificate to the members. The members distributed with it confirm the electronic signature using a public key (center public key) of the public key certificate issuing center notified in advance.

When a certain member wishes a third party to confirm a member register certificate of his/her own, the member acquires a public key certificate and attaches the acquired public key certificate to the member register certificate. This makes it possible at the side confirming an electronic signature to easily confirm the legitimacy of a new public key of the member register organization.

The public key certificate is not necessarily always attached to the electronic signature, and it is sufficient to attach it only once when a signature key and a confirmation key are updated.

When a certain member transmits a member register certificate to another member through on-line, it may be omitted to attach a public key certificate for reducing the data amount upon the transmission. In this case, the public key certificate is acquired at the side of a receiver member.

In any case, when using a public key certificate, it is necessary for a member utilizing a member register certificate or a member confirming the member register certificate to access the public key certificate issuing center so as to obtain the public key certificate every time a confirmation key is updated.

As described above, when the signature key is updated, any of the following actions is carried out between the member register organization and the member or between the members:

(1) The member register organization distributes a new confirmation key to all the members;

(2) When a certain member first uses a member register certificate, a public key certificate is acquired and attached;

(3) A public key certificate is properly acquired at the side of a member confirming an electronic signature.

However, in the foregoing three cases, the following problems are caused, respectively:

In the case (1), when the member register organization performs a key updating process, since all the users simultaneously access the member register organization to acquire a new confirmation key, corresponding processes are concentrated to a system provided at the side of the member register organization so that an operation of the system may become unstable. Particularly, when the number of the members is quite large, it is necessary to stop issuance of member register certificates after the updating of the key until the new key has been distributed to all the users.

In the case (2), the data amount upon transmission/reception is increased, and a time for acquiring the public key certificate is additionally required. Further, if the public key certificate is forged, a false center public key is distributed, and thus, the risk relies on security of a center public key in the public key certificate issuing center.

In the case (3), a member confirming an electronic signature, for example, a member which offers some service after confirming a member register certificate of a certain member, acquires a public key certificate after reception of the member register certificate of the certain member. Therefore, when the certain member first requests confirmation of the member register certificate after the updating of the key, the other member has to limit the offering of service until acquiring the public key certificate and confirming the member register certificate. For on-line accessing the public key certificate issuing center or the member register organization to Immediately acquire the public key certificate, the communication cost increases correspondingly.

As described above, there have been such disadvantages that an operation of some of the systems is adversely affected or the service utilization by the members is limited every time the signature key is updated.

It is an object of the present invention to provide an electronic signature key control method with no such disadvantages, and a system suitable for carrying out such a key control method.

DISCLOSURE OF INVENTION

A key control method of the present invention which accomplishes the foregoing object is characterized by preparing a plurality of keys whose contents are updated periodically at mutually different times; switching the plurality of keys one by one per switching cycle shorter than an updating cycle of each key; and using the switched key as a signature key for electronic signature. It is effective for facilitating the key updating that the foregoing switching cycles are set to, for example, the same time length with respect to all the keys.

Another key control method of the present invention is characterized by dividing an updating period of each of a plurality of keys, whose contents are updated periodically at mutually different times, into three periods; setting first and third divided periods as preliminary periods and an intermediate divided period as a use period for using as a signature key for electronic signature; and switching the use periods of the respective keys so as to continue in time with each other but not to overlap with each other.

Another key control method of the present invention is characterized by preparing a first key updated periodically and a second key updated periodically at different times as compared with the first key; using either of the first and second keys as a signature key for electronic signature by alternately switching them per switching cycle shorter than an updating cycle of each key; making public in pair a third key which is updated synchronously with an updating time of the first key and becomes a confirmation key when the first key is the signature key, and a fourth key which is updated synchronously with an updating time of the second key and becomes a confirmation key when the second key is the signature key; and offering the third and fourth keys for confirming the electronic signature. In this case, a use termination time may be added to each of the third and fourth keys.

The foregoing updating cycle is set to no longer than a time period derived by subtracting an effective term of an electronic signature produced based on the corresponding key from an average time over which security of the corresponding key can be ensured.

Another key control method of the present invention comprises a step of preparing M (M represents a natural number greater than one) signature keys updated periodically at mutually different times, and making public M confirmation keys at the same time, the M confirmation keys updated synchronously with updating times of the signature keys, respectively; a step of executing an electronic signature with respect to given signature object data by selecting one of the prepared M signature keys per cycle shorter than an updating cycle of the corresponding signature key in a given order; and a step of confirming the electronic signature using one of the M confirmation keys made public.

Each of the foregoing key control methods can be carried out by an electronic signature key control system comprising a key holding means for holding a plurality of keys to be used as signature keys for electronic signature; a key updating means for cyclically updating the contents of the plurality of keys at mutually different times; and a signature means for reading out the key, whose contents were updated by the key updating means, from the key holding means according to a given rule, and executing an electronic signature with respect to given signature object data using the read-out key as the signature key.

A key control system comprising a key holding means for holding a first key and a second key which are used as signature keys for electronic signature; a key updating means for updating the contents of the first key and the second key in the same cycle at mutually different times; and a signature means for reading out the key, whose contents were updated by the key updating means, from the key holding means according to a given rule, and executing an electronic signature with respect to given signature object data using the read-out first or second key as the signature key, is also preferable for carrying out each of the key control methods of the present invention.

It is preferable that the foregoing key control system further comprises a key holding means for holding a third key which is updated synchronously with the first key and becomes a confirmation key when the first key is the signature key, and a fourth key which is updated synchronously with the second key and becomes a confirmation key when the second key is the signature key, wherein when the electronic signature is carried out using the first or second key, the third and fourth keys are made public at the same time.

The present invention further provides an electronic signature authentication system which, upon receiving an electronic signature and confirmation keys, can judge whether the electronic signature in question is legitimate.

This authentication system is characterized by comprising a signature receiving means for receiving an electronic signature produced with one of M (M represents a natural number greater than one) signature keys, and M confirmation keys which are updated synchronously with updating the M signature keys including the signature key used for the electronic signature; and a signature confirming means for confirming the received electronic signature with one of the M confirmation keys, wherein the electronic signature confirmed by the signature confirming means is judged to be legitimate.

It may be arranged that the signature receiving means receives a plurality of electronic signatures produced with signature keys, updated at different times, of M signature keys, and M confirmation keys which are updated synchronously with updating the M signature keys including the signature keys used for the electronic signatures. When the confirmation is achieved by this authentication system, it is easily seen that the electronic signature in question is produced at least at the key control system of the present invention.

BEST MODE FOR CARRYING OUT THE INVENTION

First, a membership system applied with the present invention will be schematically explained.

In this membership system, for example, a plurality of member operating systems which are operable only by members, a member register system provided at a member register organization which controls the members, and a public key certificate issuing center are mutually connected in a two-way communicable fashion, for example, non-shown communication means are connected via a public network, so as to carry out key distribution through authenticated communication. However, if the authenticated communication is possible between each member operating system and the member register system, the open key certificate issuing center is not necessarily required.

Although a common key system, i.e. a system where a signature key and a confirmation key are the same key, may also be used in the authenticated communication, it is assumed for convenience in the following description that the foregoing public key system is used.

The member register system has a function of performing a member registration in response to member registration request information from each member, a function of issuing a member register certificate to each registered member using a secret key (i.e. signature key) of its organization, a function of updating the signature key periodically, and a function of producing and updating a public key (i.e. confirmation key) corresponding to the signature key. These functions will be described later in detail.

The public key certificate issuing center produces an electronic signature with its own secret key (center secret key), using a name of the member register organization, the confirmation key produced at the member register system, and other information (signature algorithm, effective term of signature, etc.) as signature object data, holds it as a public key certificate and properly issues the public key certificate in response to a request from each member.

Each member operating system acquires the confirmation key directly from the member register system or via the public key certificate issuing center, and applies for a member registration. When acquiring the confirmation key via the public key certificate issuing center, a process of confirming the public key certificate with a public key (center secret key) of the public key certificate issuing center is required.

In the following description, the member operating system will be referred to as "member", the member register system as "member register organization" and the public key certificate issuing center as "center", except for a case wherein it is necessary to show the system structure or its constituent components.

Figure 1:
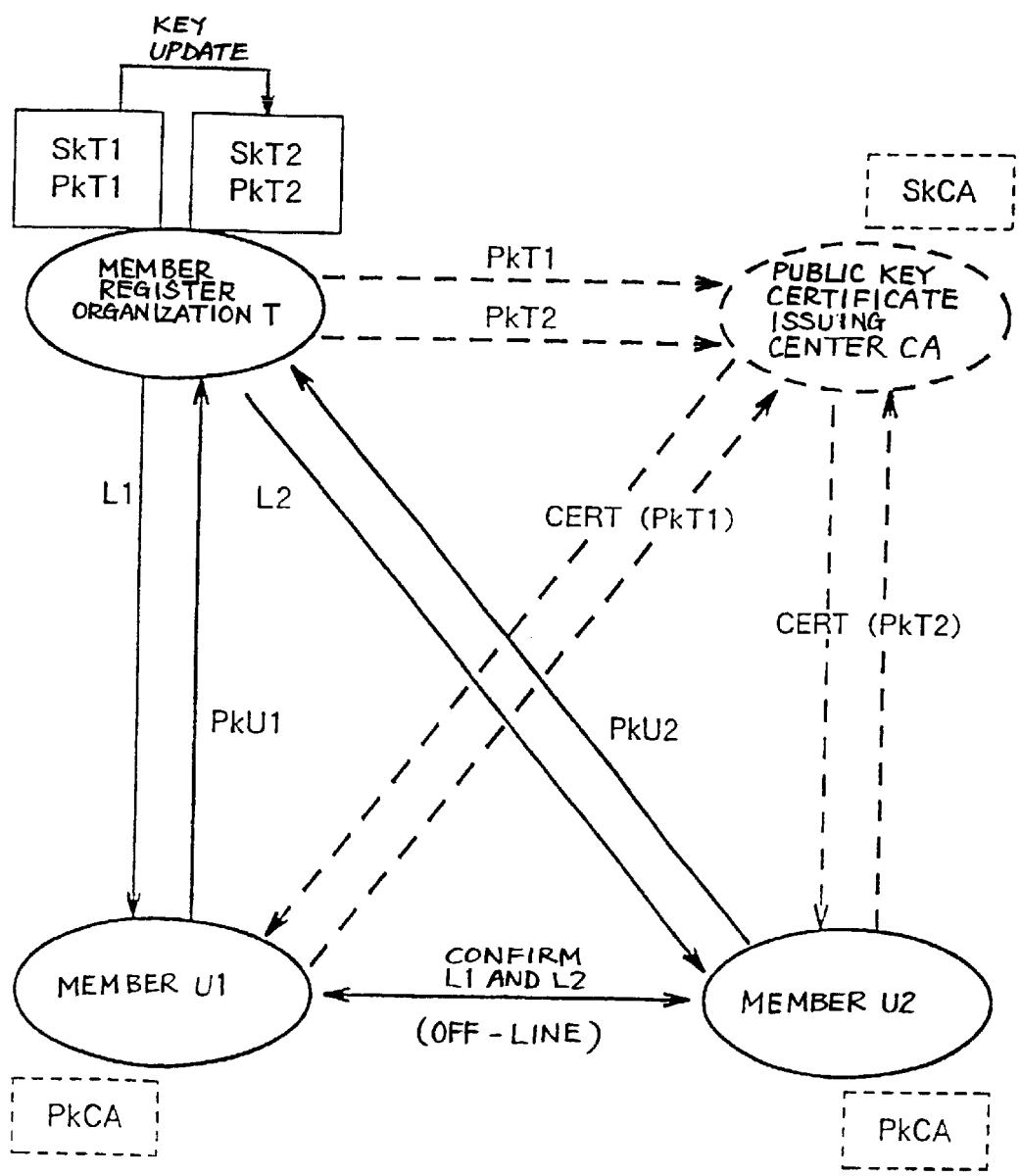
FIG. 1 is a schematic structural diagram of a membership system to which the present invention is applied.

FIG. 1 is a diagram schematically showing the state of delivery and reception of keys and other electronic information carried out among the member register organization, the members and the center. A portion associated with the center CA is shown by broken lines, meaning that, as described before, it is not essential but used in this example.

In FIG. 1, "SkT1" and "SkT2" represent signature keys before and after updating, "PkT1" and "PkT2" represent confirmation keys, "SkCA" represents a center secret key, "PkCA" represents a center public key, "CERT" represents a public key certificate, and "L1, L2" are member register certificates issued to the members U1 and U2. An electronic signature with the signature key (SkT1, SkT2) is executed upon issuing the member register certificate. In the description hereinafter, the issuance of the member register certificate is synonymous with the electronic signature.

Figure 2:
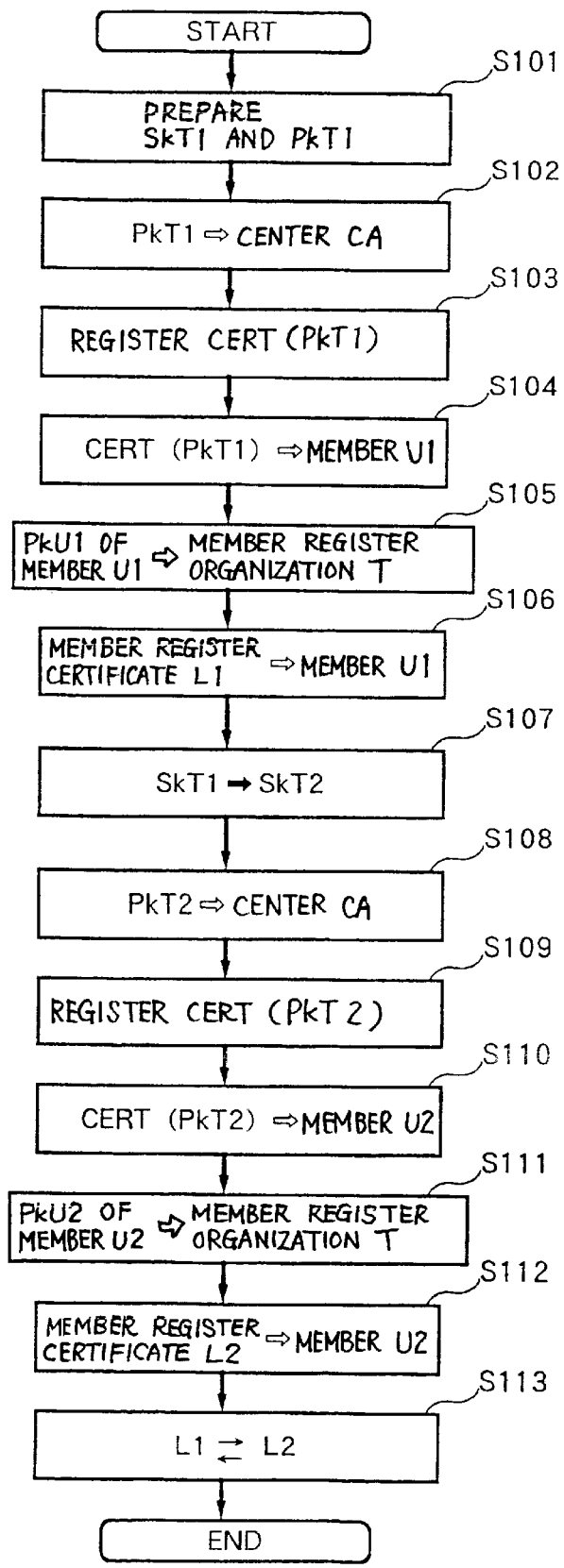
FIG. 2 is a procedure explanatory diagram showing a delivery sequence of keys etc.

A delivery sequence for the keys etc. in FIG. 1 is as shown in FIG. 2.

It is assumed that each of the members U1 and U2 acquires in advance the center public key PkCA and can confirm the public key certificate upon acquisition thereof.

First, the signature key SkT1 and the confirmation key PkT1 are prepared at the member register organization T (step S101). The confirmation key PkT1 is registered at the center CA (steps S102 and S103). After acquiring the public key certificate CERT (PkT1) from the center CA (step S104), the member U1 applies for a member registration to the member register organization T. In this event, the member U1 sends out its own confirmation key (PkU1) (step S105). With respect to the confirmation key (PkU1) of the member and other information, the member register organization T issues the member register certificate L1 using the signature key SkT1 (step S106).

After a lapse of a given time, the member register organization T updates the signature key SkT1 to the signature key SkT2 (step S107). Then, the confirmation key PkT2 corresponding to the signature key SkT2 after the updating is re-registered at the center CA (steps S108 and S109).

After acquiring the public key certificate CERT (PkT2) from the center CA (step S110), the member U2 applies for a member registration to the member register organization T. In this event, the member U2 sends out its own confirmation key (PkU2) (step S111). With respect to this application for the member registration, the member register organization T issues the member register certificate L2 using the signature key SkT2 (step S112). Thereafter, the members U1 and U2 carry out mutual authentication based on the member register certificates L1 and L2 (step S113).

When the keys etc. are delivered as described above, at least the followings are required to be carried out:

(1) The member register organization T periodically updates the signature key SkT and the confirmation key PkT without stopping the issuance of the member register certificate;

(2) The member register certificate L1 issued using the signature key SkT1 and the member register certificate L2 issued using the signature key SkT2 are correctly confirmed through off-line between the members U1 and U2;

(3) Upon confirming the member register certificates L1 and L2, an operation of transmitting additional information, for example, the public key certificate CERT (PkT), to the side of a counterpart is omitted.

The key control method of the present invention carried out at the member register organization T for solving them will be described hereinbelow.

First, an example is cited as the simplest example, wherein one of two keys is set as a main key and the other as an auxiliary key, and either of them is used as a signature key for electronic signature by switching them according to a given rule, and further, two confirmation keys corresponding to the two signature keys are used in pair for confirming the electronic signature. That is, a main key and an auxiliary key are prepared for each of the signature key SkT and the confirmation key PkT. Hereinbelow, when it is necessary to distinguish between the main key and the auxiliary key, the signature key SkT as the main key will be referred to as "signature main key", the signature key SkT as the auxiliary key as "signature auxiliary key", the confirmation key PkT as the main key as "confirmation main key", and the confirmation key PkT as the auxiliary key as "confirmation auxiliary key".

The keys are periodically updated at mutually different times. Updating cycles are not necessarily the same in time length. An average time period for safe use (safe use term) is set in each key, and an updating cycle of the key is set to no greater than a time period derived by subtracting an effective term of an electronic signature produced based on the corresponding key from a safe use term of the corresponding key. This aims to ensure the security of the key by updating it before decoding thereof. The setting of the safe use term can be carried out by adjusting a security parameter of the key, such as a length of the key. The effective term of an electronic signature is equal to or shorter than a period which is the shorter of a first divided period and a last divided period.

Figure 3:
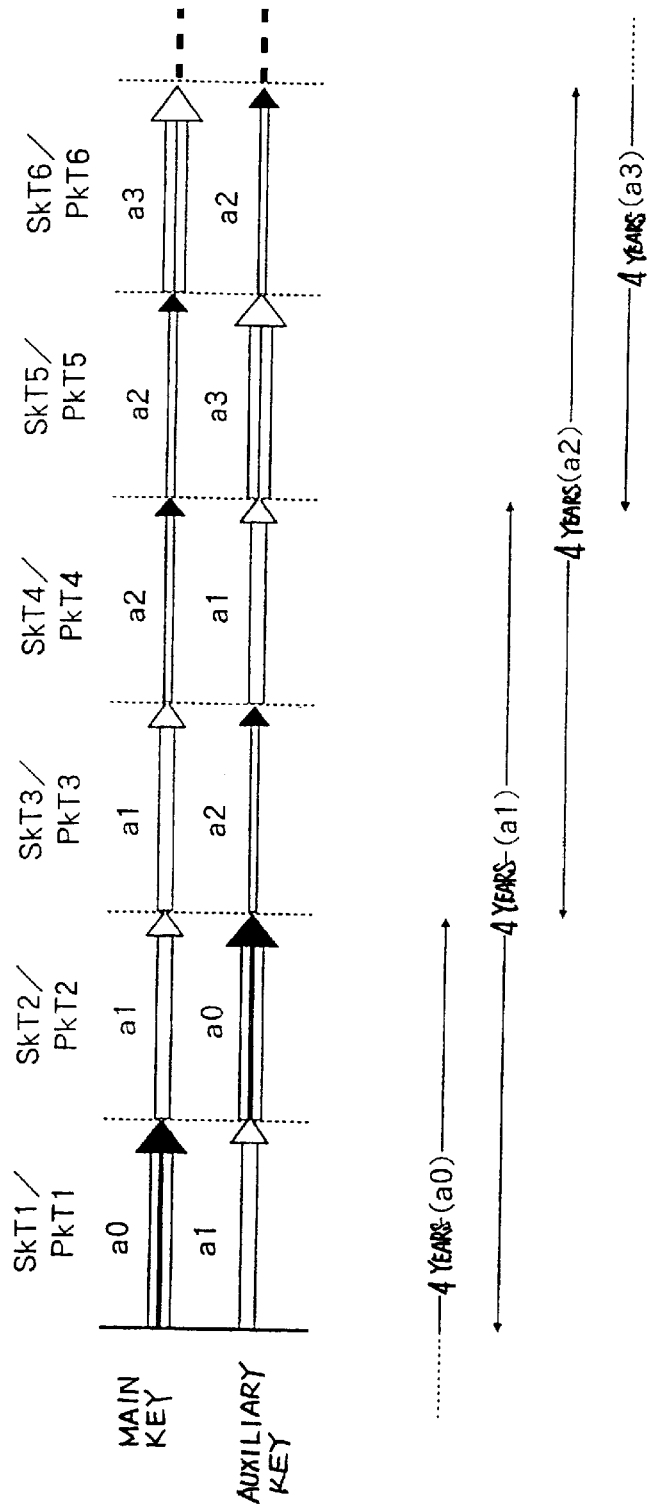
FIG. 3 is a sequence chart showing the simplest example of a key updating schedule.

FIG. 3 is a diagram concretely showing an updating schedule of each key. Since a relationship between the main key and the auxiliary key is common to the signature key SkT and the confirmation key PkT, it is shown with respect to only one of them. Here, for convenience, update object periods of the two keys are both set to one year, safe use terms thereof are both set to five years and updating cycles thereof are all set to four years, and each key is used as an auxiliary key in the first one year and the last one year and as a main key in the intermediate two years. In the figure, "a0", "a1", "a3" and "a4" represent the contents (values) of the keys, respectively.

In the example of FIG. 3, a use period of one of the keys continues in time with a use period of the other key, and both use periods do not overlap with each other. Further, the sum of the periods as the auxiliary key is set equal in time length to the use period, and moreover, the first one year as the main key and the last one year as the auxiliary key before updating are set to coincide with each other, and the last one year as the main key and the first one year as the auxiliary key after updating are set to coincide with each other. This is mainly for considering easiness of the key control.

The key updating is carried out at a start point of the last one year while one of the keys continues to be the main key. Then, the use period of the updated key is started at a time point of termination of the use period of the one of the keys.

A combination of the contents of the main key and the auxiliary key in each of the update object periods differs from that in another period. Specifically, it is a0 and a1 in a certain update object period while a1 and a0 in another update object period, or a1 and a2, . . . .

When the foregoing key updating is applied to the signature key (SkT), the corresponding confirmation key (PkT) is also updated. The signature main key is used for producing an electronic signature, i.e. for issuing a member register certificate, while either of the confirmation main key and the confirmation auxiliary key is used for confirming the electronic signature, i.e. for confirming the member register certificate. Despite the foregoing switching, each key can be used as a signature key.

An effective term of the member register certificate, issued using the signature main key while the key updating is executed according to the foregoing schedule, becomes one year, i.e. one period. Accordingly, as described before, if the two members U1 and U2 mutually confirm the member register certificates L1 and L2, they were issued in the same period or in the periods offset only by one. In case of member register certificates issued in the periods offset by two, an effective term of one of them has expired. Each of the members having the member register certificates whose effective terms overlap with each other, can confirm the member register certificate of the other member using either of the confirmation main key and the confirmation auxiliary key.

It is possible to add a use termination time to the confirmation main key and the confirmation auxiliary key so that, when confirming a member register certificate of another member, a member is prevented from using the key exceeding the use termination time. This makes it possible to easily deal with unjust alteration carried out through decoding of the key exceeding the use termination time.

In the example of FIG. 3, the updating cycles of the two keys are all set to four years. However, as shown in FIGS. 4 and 5, the key control method of the present invention can be carried out even when updating cycles of two keys A and B are not constant, respectively.

Figure 4:
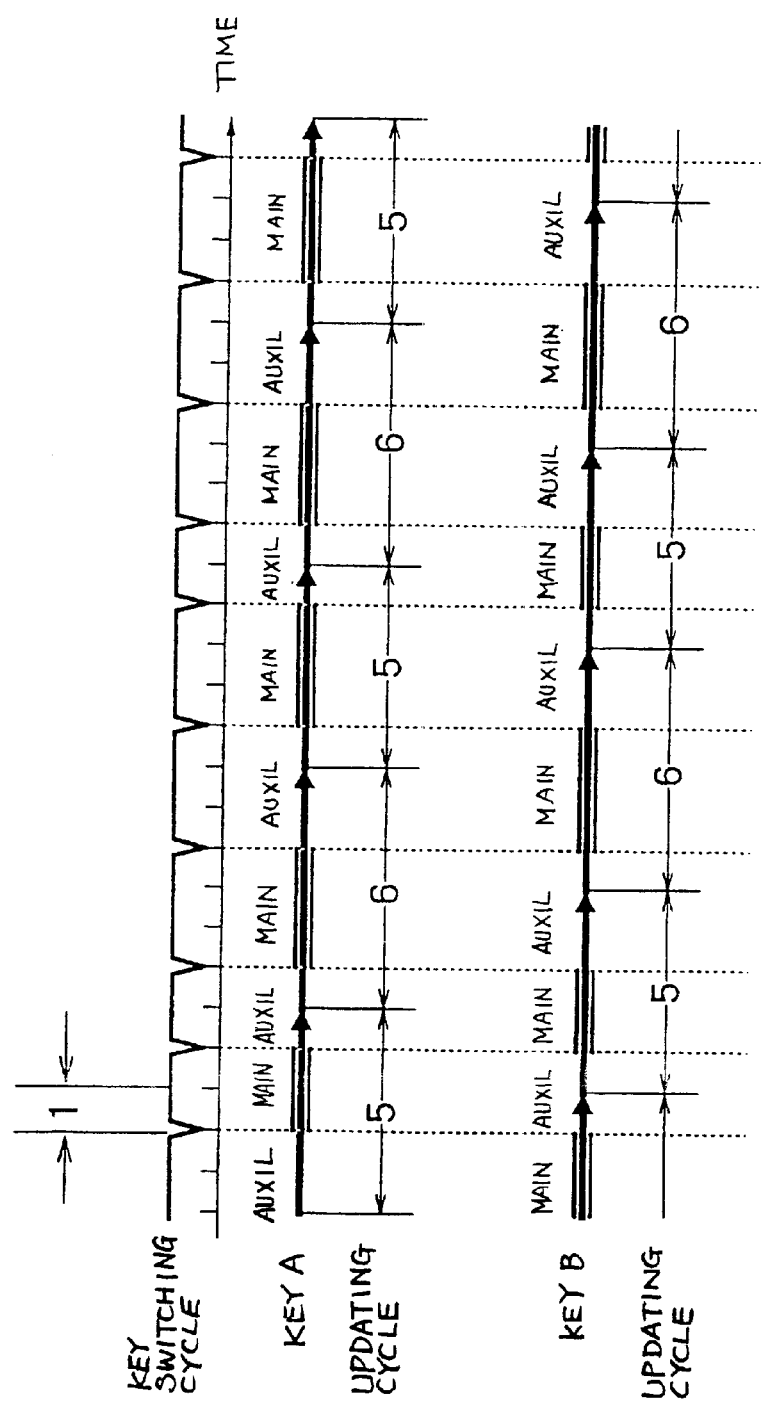
FIG. 4 is a sequence chart showing a key updating schedule example wherein cycles change.

For example, in a key updating schedule example of FIG. 4, the updating cycles of the keys A and B change, though periodically, as 5 years, 6 years, 5 years, 6 years, . . . In this example, like in the example of FIG. 3, while one of the keys is used as a main key, the other key becomes an auxiliary key. However, it differs in that use periods of each key are not constant. Specifically, the use periods may be two years in five years and three years in five years. However, even in this case, the key updating can be smoothly carried out by updating one of the keys while the other key continues to be a main key and by starting a use period of the updated key (which is an auxiliary key up to then) at a time point of termination of the use period of the other key. Further, by setting safe use terms of the respective keys to be longer than the foregoing updating cycles and by setting an effective term of the electronic signature to be no longer than one year from a time point when it can be used as the signature main key, the security upon using the key can be ensured. Also in this case, the confirmation main key and the confirmation auxiliary key are made public in pair, and the electronic signature can be confirmed using either of the paired confirmation keys.

Figure 5:
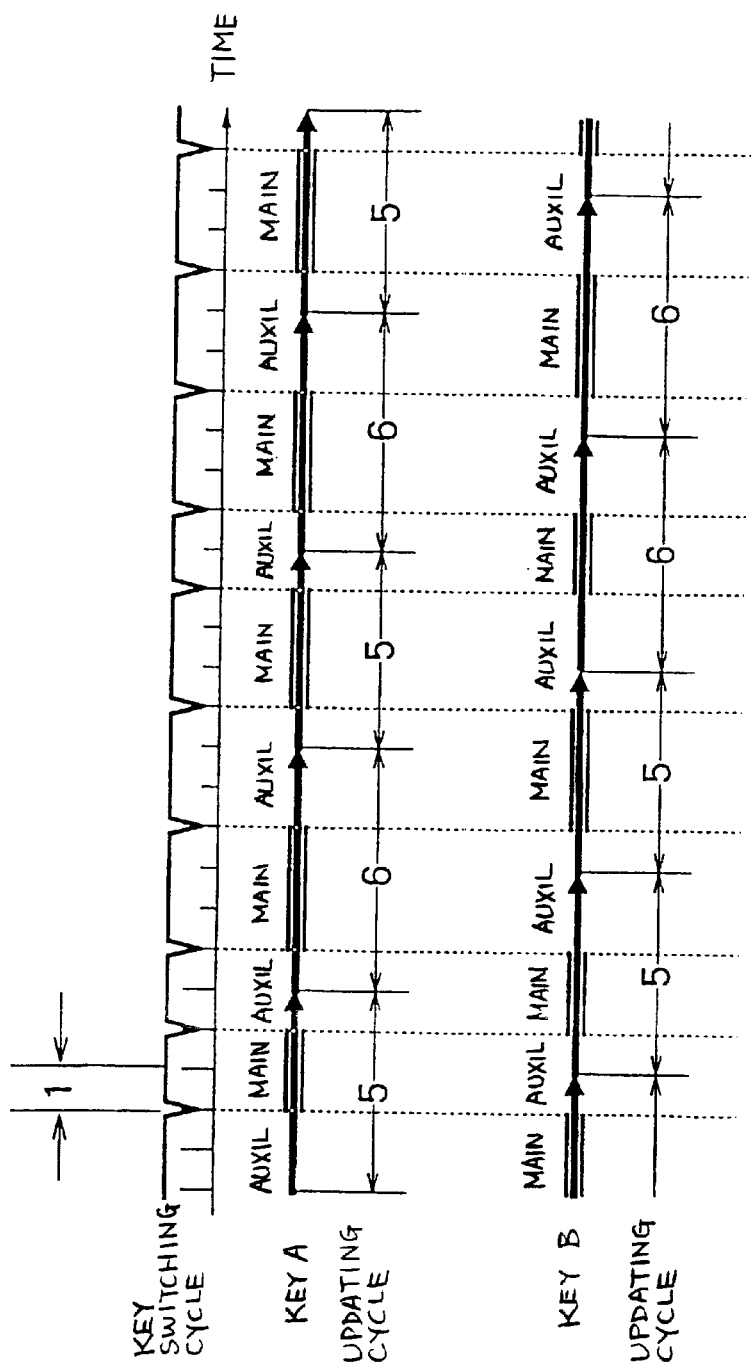
FIG. 5 is a sequence chart showing another key updating schedule example wherein cycles change.

In a key updating schedule example of FIG. 5, updating cycles of a key A change as 5 years, 6 years, 5 years, 6 years, . . . , while updating cycles of a key B change as 5 years, 5 years, 6 years, 6 years, . . . . Also in this case, by executing the key updating according to a rule like the above and by alternately switching between a main key and an auxiliary key, effects similar to those in the examples of FIGS. 3 and 4 can be expected.

In the foregoing examples, two keys are prepared for each of signature and confirmation. However, the key control method of the present invention can be carried out even in a case of more than two keys. For example, FIG. 6 shows a key updating schedule example wherein five keys are used.

Figure 6:
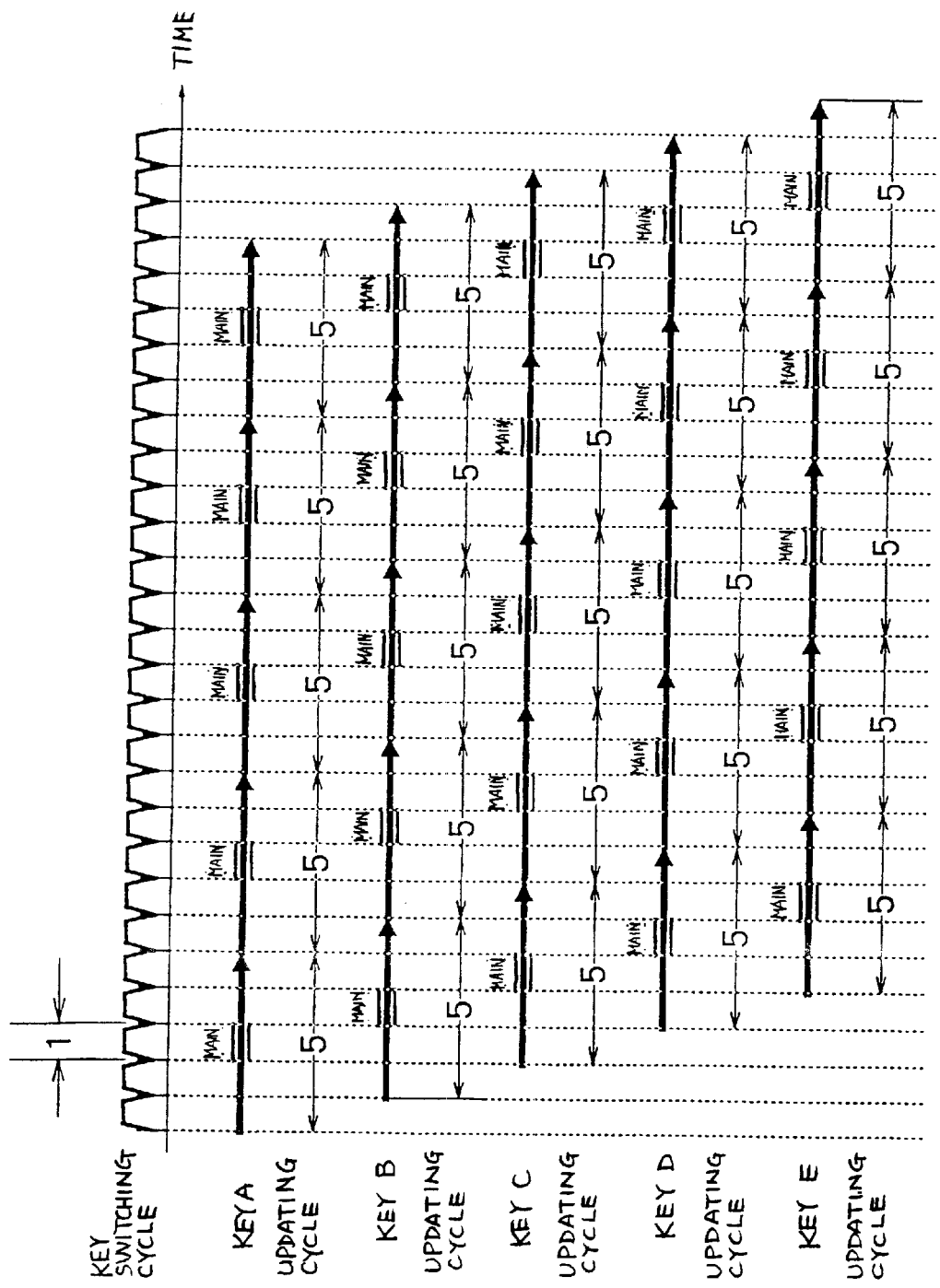
FIG. 6 is a sequence chart showing a key updating schedule example wherein five keys are used.

In the example of FIG. 6, for convenience, five keys A to E are all updated per cycle of five years and alternately switched to main keys per year, respectively. Specifically, periods of each key to be used as an auxiliary key are two years before and after a use period (one year), respectively. If a safe use term of each of the keys A to E is set to no shorter than seven years, an effective term of an electronic signature can be set to two years at maximum, which is longer than the effective term (no longer than one year) in the example of FIG. 3 (the number of keys is two).

In the key updating schedule example of FIG. 6, the number of confirmation keys simultaneously made public for confirmation after producing the electronic signature is five at maximum. Like in the example of FIG. 3, the electronic signature can be confirmed using any one of the five confirmation keys. As described before, the updating cycles of each of the keys A to E are not necessarily the same in time length.

Now, a key control system for carrying out the foregoing key control methods will be described.

Figure 7:
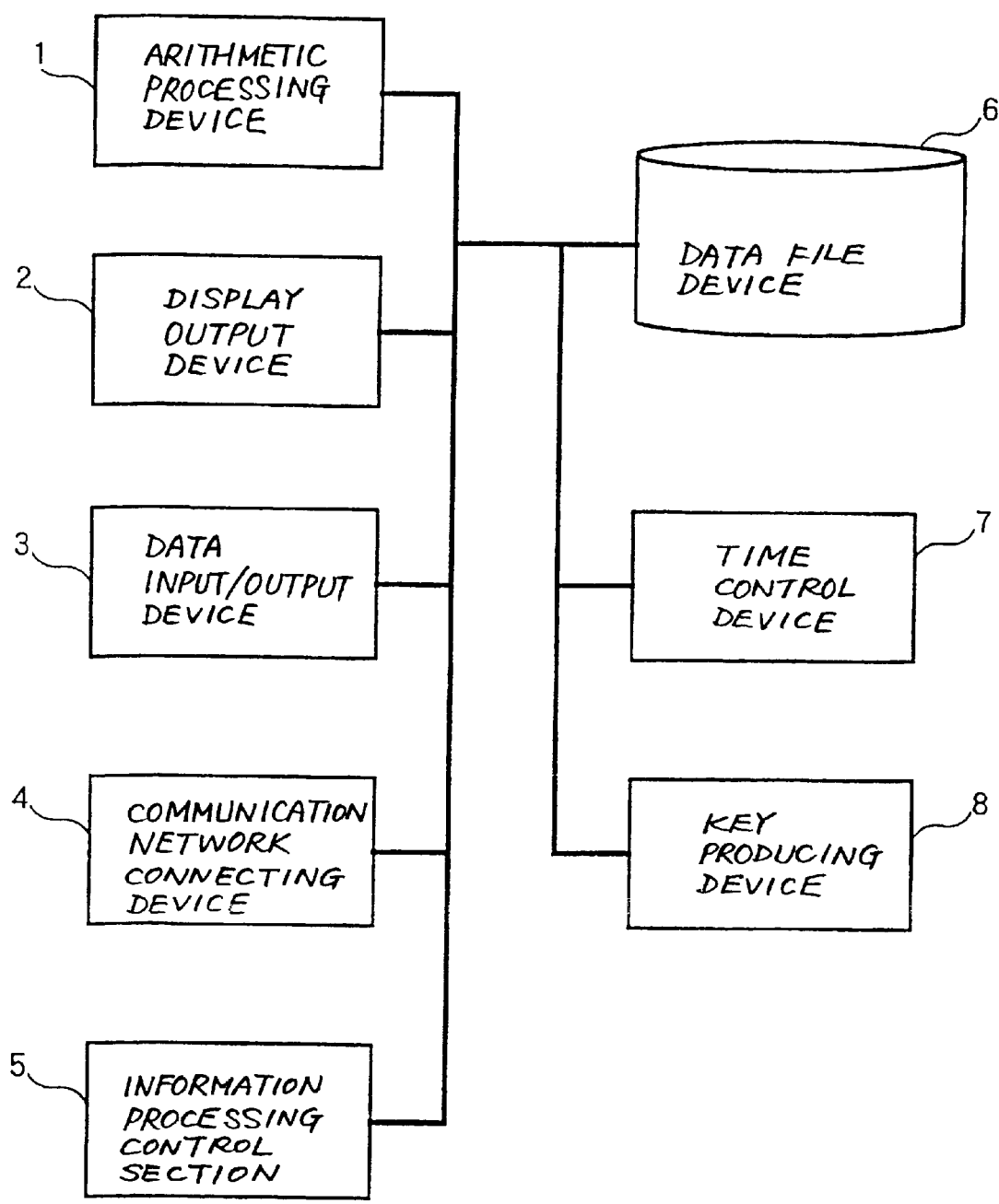
FIG. 7 is a block diagram showing a structural example of a key control system of the present invention.

The key control system is provided independently or dispersedly at the individual systems of the membership system, for example, at the foregoing member register organization T. As shown in FIG. 7, the key control system comprises an arithmetic processing device 1, a display output device 2, a data input/output device 3, a communication network connecting device 4, an information processing control section 5, a data file device 6, a time control device 7 and a key producing device 8.

The arithmetic processing device 1 is a kind of a computer which realizes required functions by executing a program stored in a non-shown external storage device or ROM. The display output device 2 is a display for visualizing the results of processing by the arithmetic processing device 1 etc. The data input/output device 3 includes a mouse, other pointing devices, a keyboard, an external storage device and interfaces between them. The communication connecting device 4 controls communications between various members and the center CA. The time control device 7 is a timer, and the key producing device 8 is a device for producing keys.

Figure 8A:
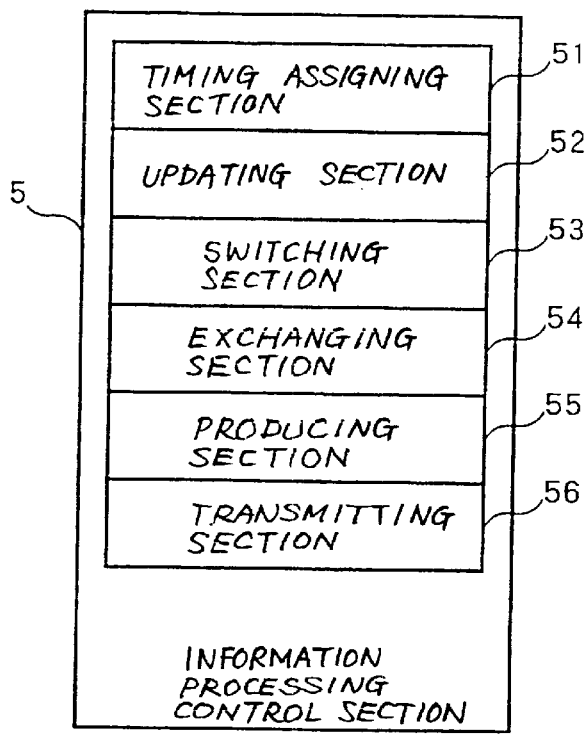
FIG. 8A is a detailed block diagram of an information processing control section in the key control system.

The information processing control section 5 is a functional block which is formed, for example, when the arithmetic processing device 1 reads and executes the foregoing program. As shown in FIG. 8(a), the information processing control section 5 comprises a timing assigning section 51 for assigning a timing of mode updating, an updating section 52 for carrying out the mode updating, a switching section 53 for switching between a main key and an auxiliary key, an exchanging section 54 for exchanging the key contents of the main key and the auxiliary key, a producing section 55 for executing an electronic signature, and a transmitting section 56 for transmitting the electronic signature, the main key and the auxiliary key to the exterior.

The timing assigning section 51 outputs a timing for selectively applying a mode A for transferring the key contents of one divided period to a subsequent divided period and a mode B for exchanging the key contents mutually upon shifting from a prior divided period to a subsequent divided period.

In the key updating schedule example of FIG. 3, the mode B is applied upon shifting to the second year after a lapse of one year so that the key contents a0 and a1 are exchanged between the main key and the auxiliary key. The mode A is applied upon shifting to the third year after a lapse of two years, wherein the key contents a1 of the main key are succeeded while the key contents a0 of the auxiliary key are updated to "a2". Since the mode A and the mode B are applied cyclically, a cycle until the mode B is applied after the mode A may be referred to as "cycle A", while a cycle until the mode A is applied after the mode B may be referred to as "cycle B" in the description hereinbelow.

The updating section 52 carries out the foregoing mode switching and stores a mode flag (cycle A/B) representing a current cycle in the data file device 6 so as to be referred to upon subsequent mode updating (cycle switching). The switching section 53 switches between the main key and the auxiliary key with respect to the keys for each of signature and confirmation. The exchanging section 54 exchanges the key contents for new ones. The producing section 55 executes, using the signature main key, an electronic signature with respect to signature object data designated per signature producing request.

Figure 8B:
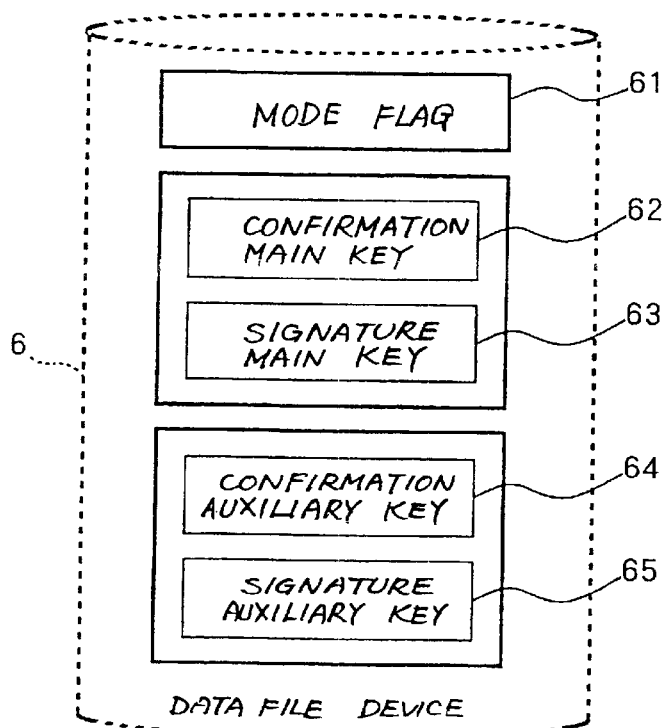
FIG. 8B is a detailed structural diagram of a data file device.

As shown in FIG. 8(b), the data file device 6 stores therein a mode flag 61, a confirmation main key 62, a signature main key 63, a confirmation auxiliary key 64 and a signature auxiliary key 65. The member register organization T holds the confirmation main key 62 and the confirmation auxiliary key 64 because there is a chance that the confirmation keys are directly distributed to the members, not via the center CA.

Now, an operation manner of a membership system utilizing the foregoing key control system will be described.

Figure 9:
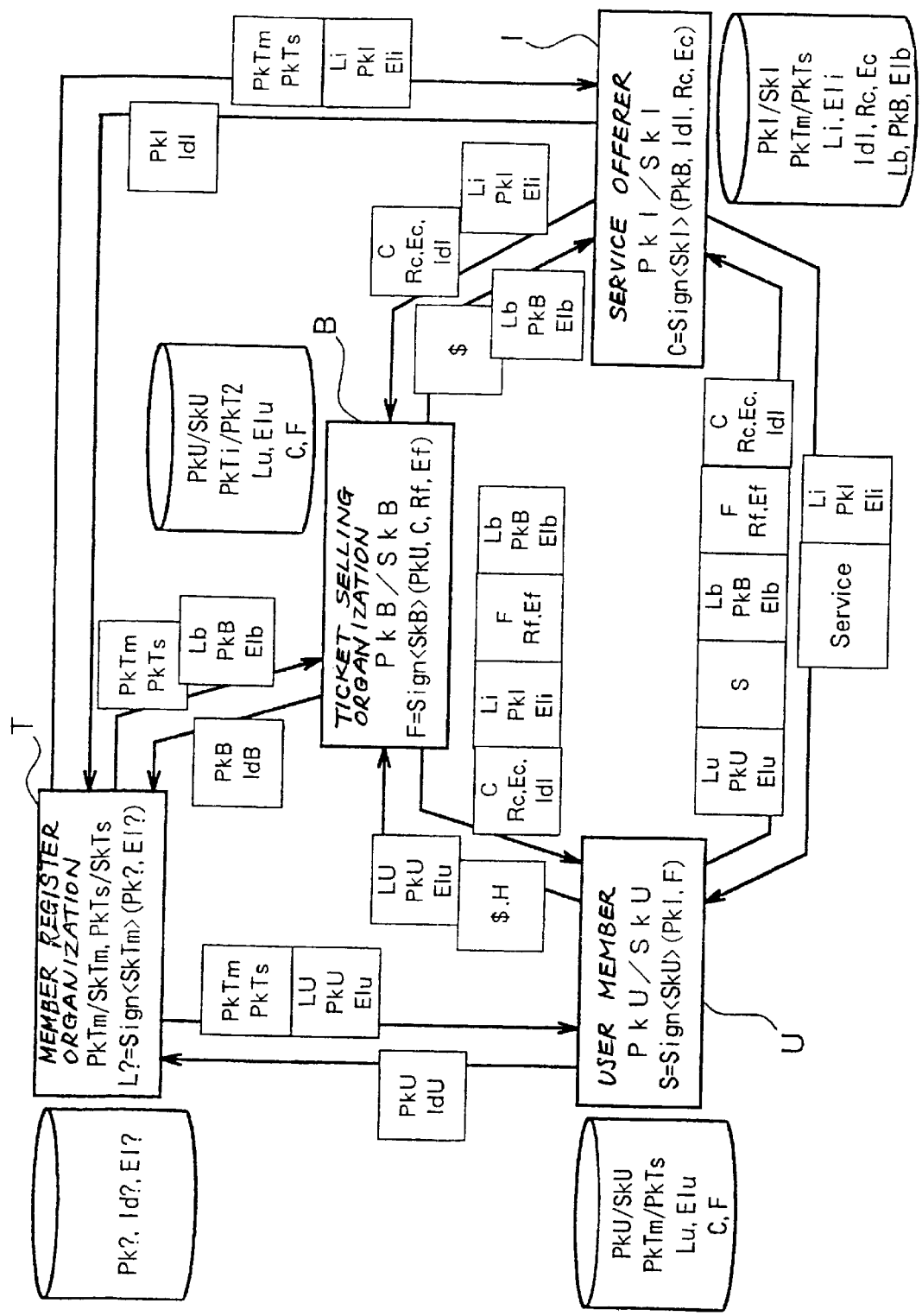
FIG. 9 is a block diagram showing an operation manner of a membership system.

As schematically shown in FIG. 9, the membership system is constituted by connecting a ticket selling organization B, a user member U and a service offerer I being members, respectively, to a member register organization T via a communication network. Although the key control system of the present invention is provided at the member register organization T, it may also be arranged that the other members are also provided therewith. It is assumed that each member is capable of at least authenticated communication using an encryption technique.

Figure 10:
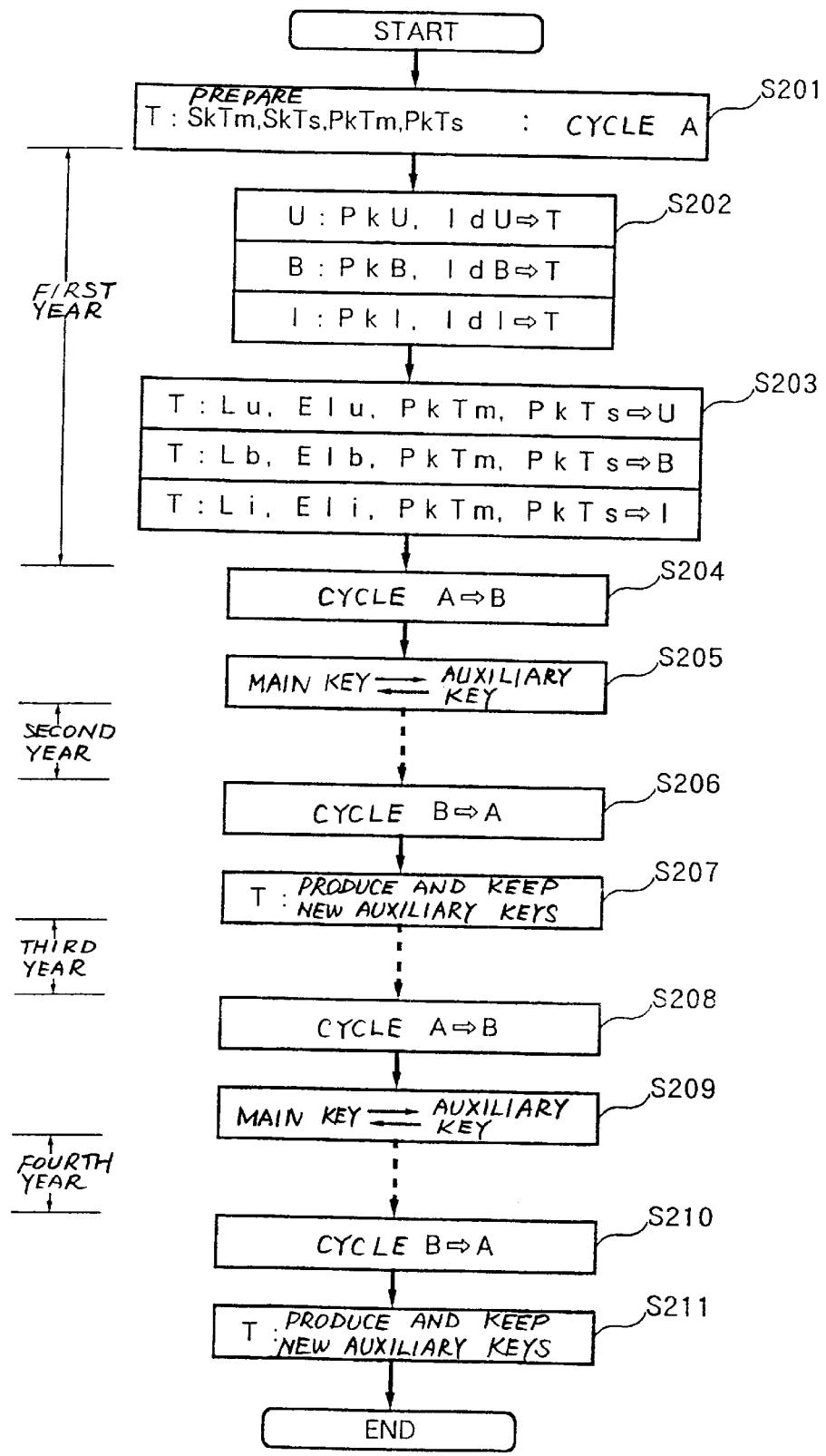
FIG. 10 is a procedure explanatory diagram for key delivery and key updating in the membership system of FIG. 9.
Figure 11:
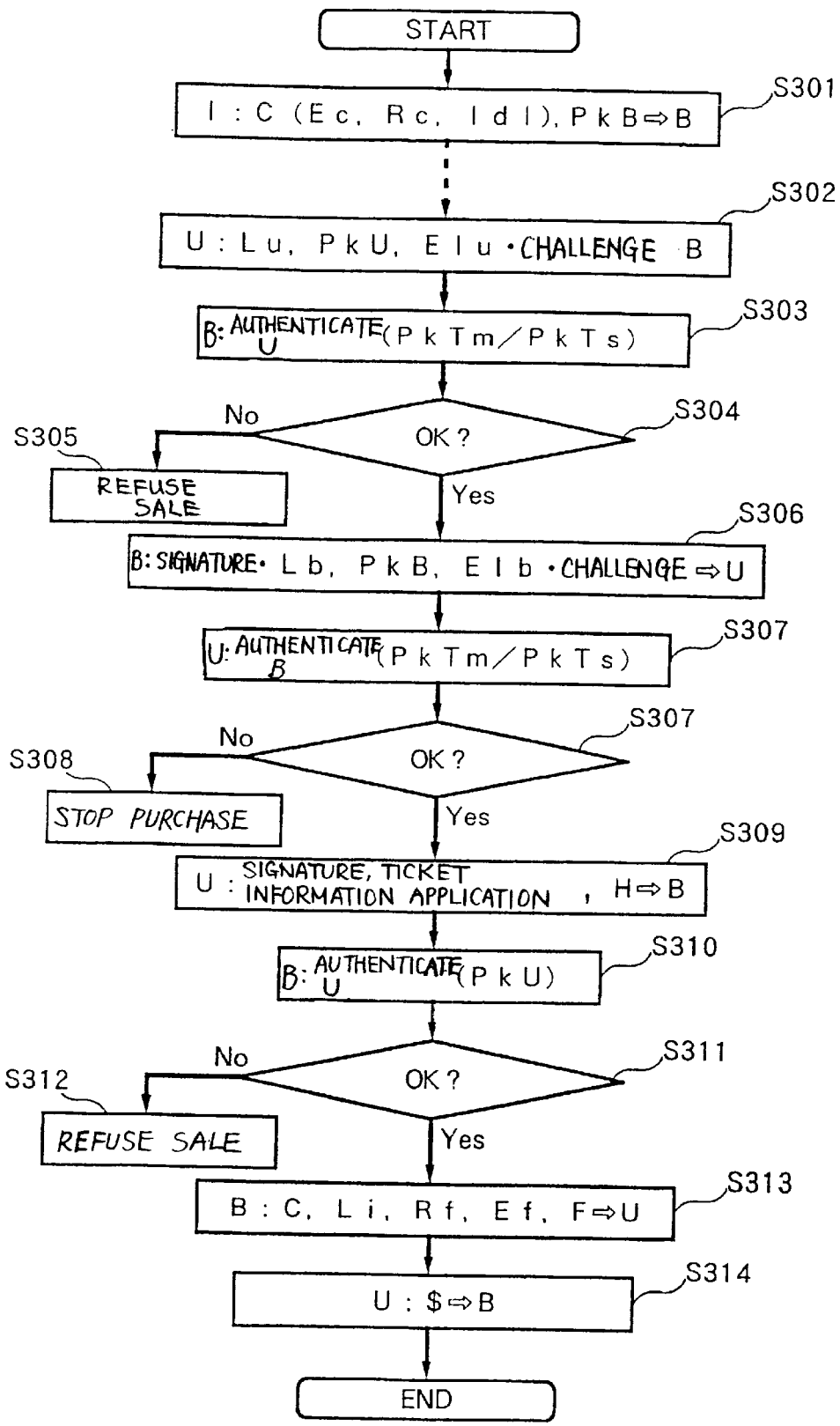
FIG. 11 is a procedure explanatory diagram for mutual authentication between members in the membership system of FIG. 9.
Figure 12:
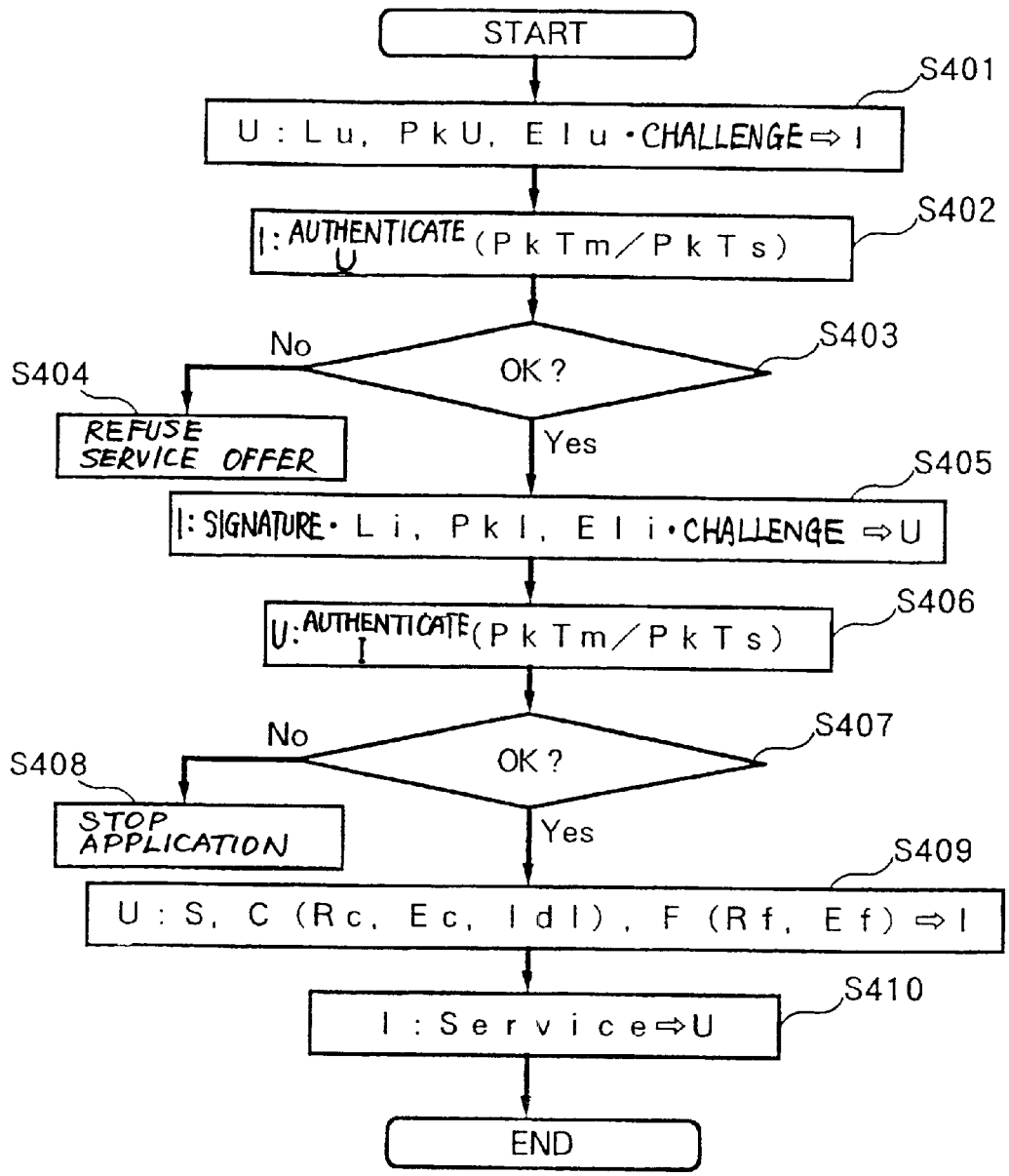
FIG. 12 is a procedure explanatory diagram for mutual authentication between members in the membership system of FIG. 9.

An operation procedure of the membership system is as shown in FIGS. 10 to 12.

(1) Member Registration

Referring to FIG. 10, the member register organization T first sets a date to carry out key updating (for example, January 1 every year). Further, the member register organization T prepares the confirmation main key PkTm 62, the signature main key SkTm 63, the confirmation auxiliary key PkTs 64 and the signature auxiliary key SkTs 65, and sets the mode flag 61 to "cycle A" (step S201).

The user member U prepares its own signature key SkU and confirmation key PkU, and transmits member registration request information including the confirmation key PkU and member information IdU such as a user name to the member register organization T (step S202).

In the member register organization T, the confirmation key PkU is extracted from the transmitted member registration request information, and signature object data is obtained by adding an effective term Elu to the confirmation key PkU at the producing section 55 of the key control system. Then, the member register organization T signs the signature object data using the signature main key SkTm and issues a member register certificate Lu. Thereafter, the transmitting section 56 transmits the member register certificate Lu together with the effective term Elu, the confirmation key PkU, the member information IdU and the foregoing confirmation main key PkTm 62 and confirmation auxiliary key PkTs 64 to the user member U (step S203).

The member register organization T can receive a member registration request at any time and issues the member register certificate Lu which is effective for one year from a date of a member registration.

Similarly, the ticket selling organization B and the service offerer I also request member registrations and receive member register certificates Lb and Li.

When the first key updating date (January 1) comes, the member register organization T refers to the mode flag 61 and updates the current cycle A to the cycle B at the updating section 52 (step S204). Subsequently, the switching section 53 switches between the main key and the auxiliary key (step S205).

When the second key updating date (January 1 next year) comes, the member register organization T updates the current cycle B to the cycle A at the updating section 52 (step S206). Subsequently, new keys produced at the key producing device 8 are kept as auxiliary keys at the exchanging section 54 (step S207). These are repeated by one more cycle in four years being an updating cycle (steps S208 to S211).

It is preferable in view of the security that the distribution of the confirmation keys (transmission of the confirmation main key PkTm 62 and the confirmation auxiliary key PkTs 64) to the user member U, the ticket selling organization B and the service offerer I includes off-line processes. For example, also by using a method of handing over upon meeting, mailing, sending by facsimile or the like, more security is ensured. If carrying out only the on-line transmission, some kind of authenticated communication is required.

When using a public key certificate of the center CA, since the normal public key certificate includes only one confirmation key being a public key, there are a method of modifying a format of public key certification to include two public keys and a method of using two public key certificates. This makes it possible to utilize the public key certificate of the center CA.

(2) Registration of Service Offer Information

Referring to FIG. 11, the service offerer I transmits item information depending on necessity, such as service offer guarantee information C, a confirmation key PkB of the ticket selling organization B, an effective term Ec of the service, an issue consecutive number Rc of a ticket, member information IdI and the service contents/amounts of money, to the ticket selling organization B (step S301). These are information which enables the service offerer I to confirm, after the fact, the genuineness of a ticket sent after the fact. By registering such information in advance at the ticket selling organization B, there is a merit that when the user member U commits double uses of the ticket or the ticket selling organization B commits an unjust thing, it can be detected before service offering.

(3) Sale of Ticket

When mutually confirming the member register certificates Lu and Lb between the user member U and the ticket selling organization B, the following procedure is carried out:

The user member U first transmits the member register certificate Lu, the confirmation key PkU, the effective term ElU and a challenge (authentication request) to the ticket selling organization B (step S302). Here, the challenge is used as an example of the encryption technique/signature technique.

The ticket selling organization B tries both of the confirmation main key PkTm and the confirmation auxiliary key PkTs held by itself, on the member register certificate Lu etc. sent from the user member U (step S303). It does not matter which of the member register certificate Lu of the user member U and the member register certificate Lb of the ticket selling organization B was issued earlier, or whether the member register organization T updated the signature key between the prior issuance and the later issuance. As long as the member register certificates Lu and Lb are both effective, the signature can be confirmed using either of the confirmation keys. It is not necessary to go to the public key certificate issuing center CA to obtain the public key certificate, or transmit it from the user. If the signature is confirmed by either of the confirmation keys, the procedure advances to a subsequent step. If not confirmed, since this means that the member register certificate Lu is not effective, sale of a ticket is refused (step S304: No, step S305).

Then, the ticket selling organization B transmits a signature, which was produced using a signature key SkB of the ticket selling organization B with respect to the its own member register certificate Lb, the confirmation key PkB, an effective term ElB and the challenge sent from the user member U, to the user member U (step S306).

The user member U tries both of the confirmation main key PkTm and the confirmation auxiliary key PkTs held by itself, on the member register certificate Lb sent from the ticket selling organization B (step S307). If the signature is confirmed by either of the confirmation keys, the procedure advances to a subsequent step. If not confirmed, since this means the member register certificate Lb to be non-effective and there is a possibility of a false ticket selling organization, the purchase is stopped (step S307: No, step S308).

When the member register certificate Lb is confirmed, the user member U confirms the signature of the ticket selling organization B relative to the challenge sent by itself, using the confirmation key PkB of the ticket selling organization B. If confirmed, the procedure advances next. It has been confirmed that the confirmation key PkB is a genuine public key of the ticket selling organization B, by confirming the member register certificate Lb of the ticket selling organization B.

The user member U transmits information H about a ticket to be purchased, attached with an electronic signature produced by the signature key of the user member U relative to ticket information and a challenge produced by the ticket selling organization B, to the ticket selling organization B so as to apply for a purchase of the ticket (step S309).

The ticket selling organization B confirms the ticket information and its electronic signature sent from the user member U, using the confirmation key PkU of the user member U (step S310). If the ticket information and its electronic signature are confirmed, the procedure advances to a subsequent process (step S311: Yes). If not confirmed, since this means that one other than a legitimate holder of the member register certificate Lu applies for the purchase, or that data is altered during communication, the sale of the ticket is refused (step S311: No, step S312).

The ticket selling organization B produces ticket signature information F with respect to signature object data including the confirmation key PkU of the user member U, the service offer guarantee information C, the effective term Ec, the issue consecutive number Rc, the member information IdI, a ticket sale consecutive number Rf of the ticket selling organization B, and a ticket effective term Ef. Since the ticket signature information F should take a different value per ticket, the signature object data includes the ticket sale consecutive number Rf. Thereafter, the member register certificate Li of the service offerer I, a confirmation key PkI, an effective term Eli, the ticket sale consecutive number Rf, the ticket effective term Ef and the ticket signature information F are transmitted to the user member U (step S313).

The user member U checks the member register certificate Li of the service offerer I using the confirmation keys PkT of the member register organization T. If the member register certificate Li is confirmed, the user member U confirms the foregoing service offer guarantee information C using the confirmation key PkI of the service offerer I and further confirms the foregoing ticket signature information F using the confirmation key PkB of the ticket selling organization B. If the ticket signature information F etc. are confirmed, the user member U pays a charge $ (step S314).

(4) Use of Ticket

Referring to FIG. 12, the user member U transmits the member register certificate Lu, the confirmation key PkU, the effective term Elu and a challenge to the service offerer I (step S401).

The service offerer I, like the ticket selling organization B, confirms the member register certificate Lu of the user member U (step S402). If confirmed, the service offerer I transmits the member register certificate Li of the service offerer I, an electronic signature relative to the challenge, and a challenge to the user member U (step S403: Yes, step S405).

The user member U also confirms the member register certificate Li of the service offerer I and the electronic signature of the challenge (step S406). If confirmed (step S407: Yes), the user member U produces, using its own signature key, an electronic signature with respect to the ticket signature information F, the confirmation key and the challenge of the service offerer I, i.e. with respect to user signature information S, the member register certificate Lb, the confirmation key PkB, the effective term Elb, the ticket signature information F, the ticket sale consecutive number Rf, the effective term Ef, the service offer guarantee information C, the issue consecutive number Rc, the effective term Ec and the member information IdI, and transmits it to the service offerer I (step S407: Yes, step S409).

The service offerer I confirms the service offer guarantee information C, the ticket signature information F, the user signature information S and the ticket effective terms Ef and Ec, and further confirms whether the ticket has been used. If confirmed, an offer of the service is started (step S410). If the results of the mutual authentication between the service offerer I and the user member U are negative, the service offer or the application is stopped (step S403: No, step S404, step S407: No, step S408).

(5) Assignment of Ticket

Through the following procedure, transfer of a ticket can be carried out between members.

A member U1 delivers a ticket with a signature indicative of transfer certification to a member U2. The member U2 transmits the ticket and the transfer certification to the service offerer I. The service offerer I confirms the ticket and the transfer certification and offers a service to the member U2.

While running the membership system, there arises a case wherein it becomes necessary to confirm by other than the foregoing ticket selling organization B or ticket offerer I whether a member register certificate presented by the user member U is issued from the member register organization T, or whether an electronic signature is legitimate. In this event, the legitimacy of the member register certificate in question is confirmed using an authentication system of the present invention.

The authentication system is provided with a first confirming section which receives an electronic signature and a plurality of confirmation keys and confirms the contents thereof, and a second confirming section which confirms the received electronic signature with one of the plurality of confirmation keys. If confirmed at the second confirming section, it is determined that the electronic signature is legitimate. These confirming sections are, for example, functional blocks formed in a computer when the computer reads and executes a given program.

The received electronic signature may be produced by one of signature keys updated at different times.

Figure 13:
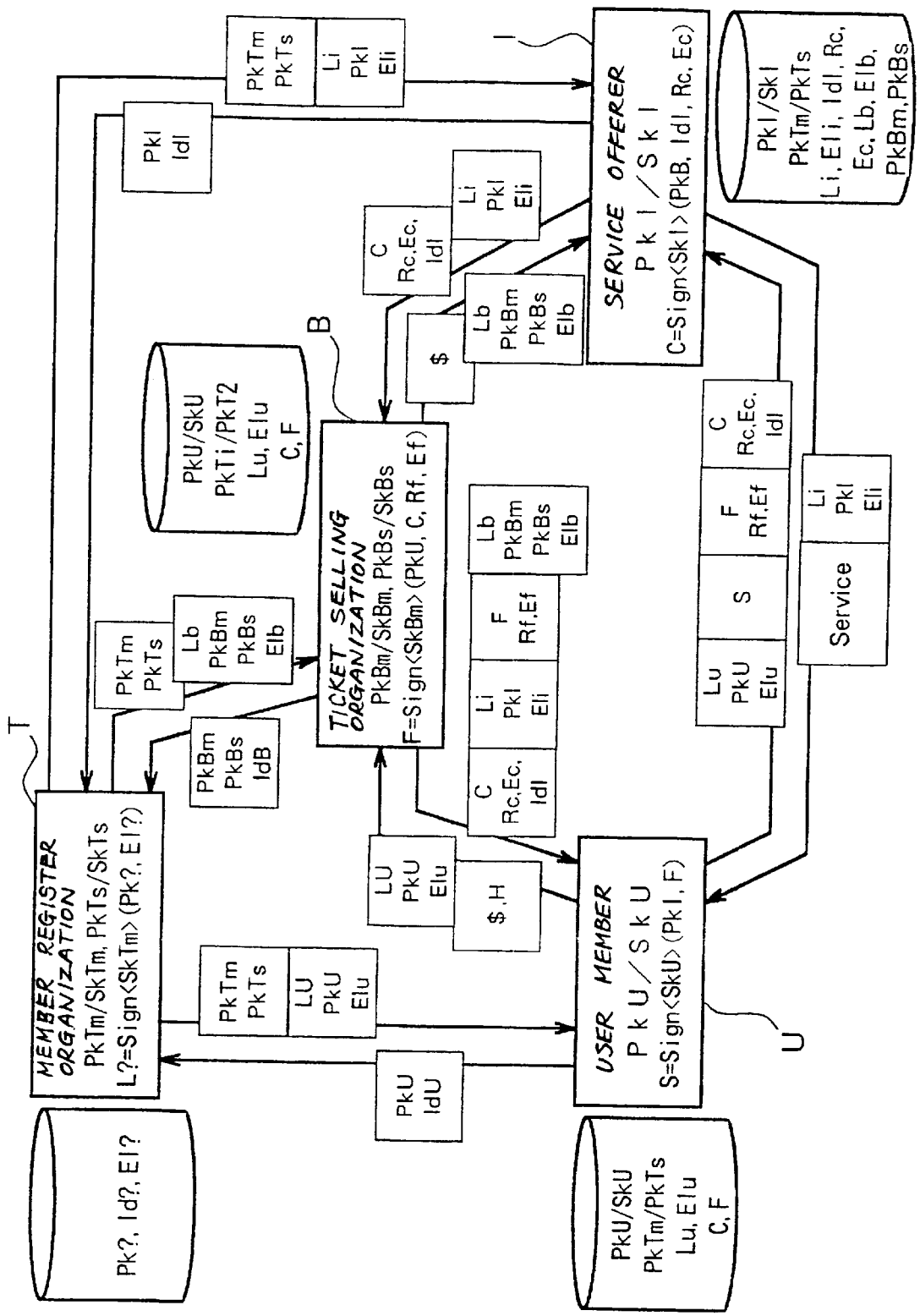
FIG. 13 is a block diagram showing an operation manner of another membership system.

Referring now to FIG. 13, another structural example of a membership system will be shown.

Although the basic operation is the same as that of the membership system of the structure shown in FIG. 9, the key control systems of the present invention are provided not only at the member register organization T but also at the ticket selling organization B in this example. Further, in the membership system of the structure shown in FIG. 9, the ticket selling organization B has a pair of keys, while, in this example, issuance of a member register certificate L is requested using two pairs of keys.

Specifically, in the ticket selling organization B, two signature keys for ticket (SkBm/SkBs: hereinafter "ticket signature keys") are prepared as a main key and an auxiliary key, which are updated, for example, according to the key control schedule as shown in FIG. 3.

Updating timings of the member register certificate L and updating timings of each ticket signature key are not necessarily set the same with each other, but may be set the same with each other. However, it is necessary that each ticket signature key has an effective term equal to or longer than an effective term of the member register certificate L.

Here, such ticket signature keys are used each having the same updating timings as the member register certificate L and an effective term of the same time length as the member register certificate L. For example, it is assumed that a member registration is executed on April 1 and updated per year.

When an effective term Elb of a member register certificate Lb of the ticket selling organization B has expired, the ticket selling organization B sends its own confirmation keys PkBm/PkBs at that time to the member register organization T to request issuance of a new member register certificate Lb.

Upon depositing service offer guarantee information C at the ticket selling organization B, the service offerer I acquires the member register certificate Lb of the ticket selling organization B, the confirmation keys PkBm/PkBs and the effective term Elb. An effective term Ec of the service offer guarantee information C is set to, for example, no longer than one year after the issuance. If the signature of the member register certificate Lb is confirmed, the member register certificate Lb, the confirmation keys PkBm/PkBs and the effective term Elb are kept.

Upon purchasing a ticket, the user member U acquires the member register certificate Lb of the ticket selling organization B. It is one of the merits to provide the key control system of the present invention at the ticket selling organization B that it is not necessary to keep the acquired member register certificate Lb of the ticket selling organization after confirming the ticket.

The user member U transmits the ticket to the service offerer I. Here, the user member U transmits the service offer guarantee information C, ticket signature information F, user signature information S, a member register certificate Lu, the effective term Ec, an issuance consecutive number Rc, member information IdI, a ticket sale consecutive number Rf, an effective term Ef, a confirmation key PkU and an effective term Elu.

Even in a case where the key of the service offerer I is updated after the service offerer I acquires the member register certificate Lb of the ticket selling organization B and before the user member U acquires the signature of the ticket selling organization B, since the member register certificate Lb can be confirmed with either of the main key and the auxiliary key of the ticket selling organization B, it is not necessary to carry out a process of acquiring the key again.

Now, the key updating schedule will be described.

Also in this case, the member register organization T updates each key per year. As described before, the member register organization T produces a key, effective for five years, every two years. This key is used as an auxiliary key in the first and last periods, i.e. in the periods of the first and fourth years, and as a main key in the intermediate two periods, i.e. in the periods of the second and third years. In this case, the effective term of the member register certificate is set to one year or less than one year. The ticket selling organization B updates the keys at different timings as compared with the member register organization T. In this case, the cycle is the same, i.e. one year. An effective term of the ticket signature information F is set to one year or less than one year.

The member register organization T and the ticket selling organization B register the updated keys, respectively. This is for substituting for authenticated communication. With this arrangement, the user member U and the service offerer I can acquire the keys of the member register organization T and the ticket selling organization B from the center CA when updating the member register certificate L, registering the service offer guarantee information C and purchasing the ticket signature information F.

Hereinbelow, the run of actual key updating will be described according to a schedule example of FIG. 14.

Here, it is the main point that the member register certificates issued by the member register organization T can be confirmed between the service offerer I and the ticket selling organization B upon depositing the service offer guarantee information C, between the user member U and the ticket selling organization B upon purchasing the ticket and between the user member U and the service offerer I upon using the ticket, and that the ticket signature information F issued by the ticket selling organization B can be confirmed upon using the ticket.

Figure 14:
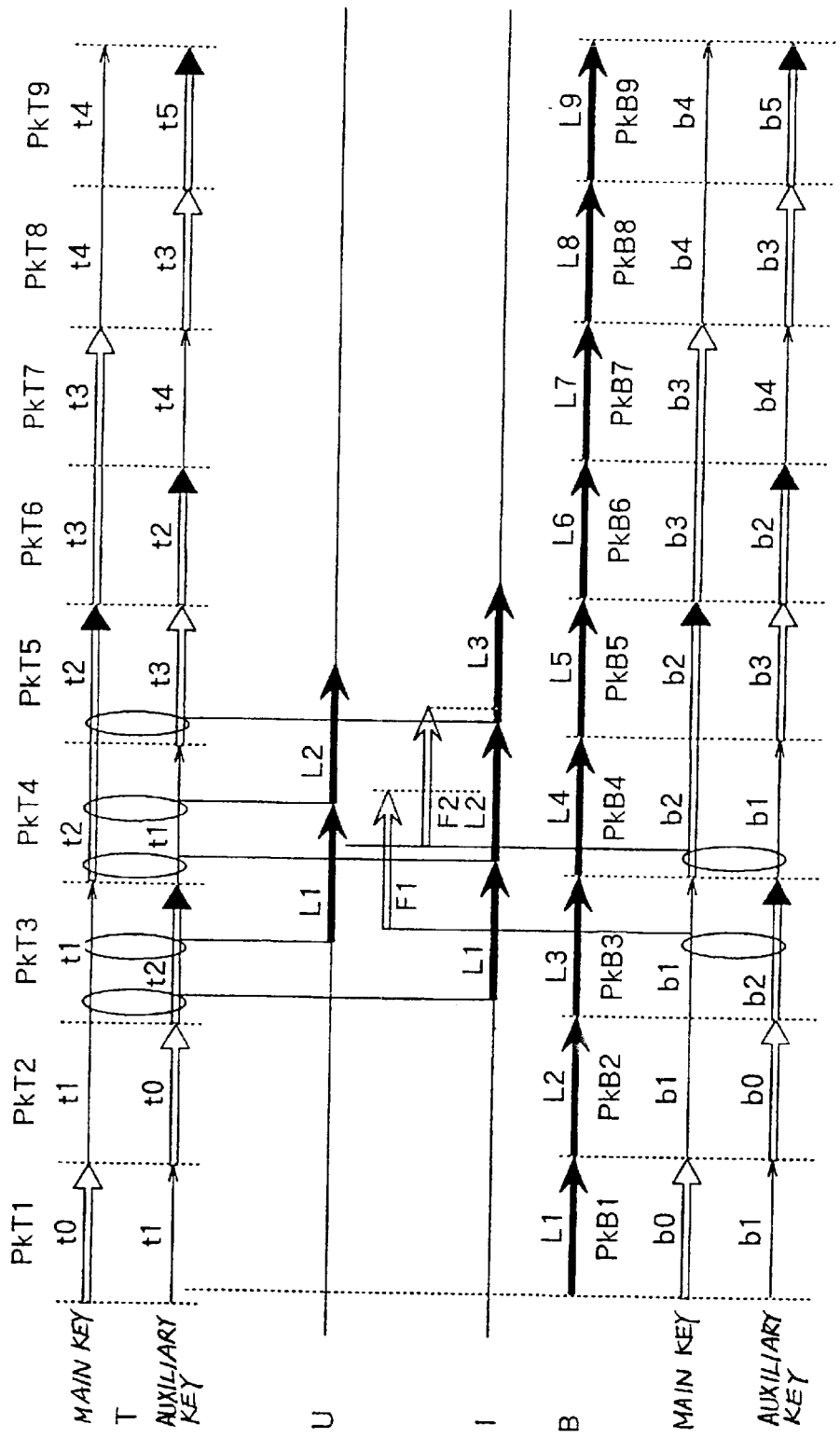
FIG. 14 is a sequence chart showing a key updating schedule example in the membership system of FIG. 13.

In FIG. 14, it is assumed that the contents of confirmation keys PkT1 in the first period (first year) are such that a main key is t0 and an auxiliary key is t1. In the second period, confirmation keys PkT2 are such that a main key and an auxiliary key are switched therebetween and thus the main key becomes t1 while the auxiliary key becomes t0. Further, in the third period, confirmation keys PkT3 are such that a main key remains t1 while an auxiliary key has the contents t2 newly produced.

A member register certificate L1 of the user member U is issued in the third period. Specifically, the member register certificate L1 is produced by a main key of signature keys SkT3 corresponding to the main key t1 of the confirmation keys PkT3 in the third period. At this time, the main key t1 and the auxiliary key t2 of the confirmation keys PkT3 in the third period are delivered to the user member U. Then, a member register certificate L2 is issued in the fourth period. Specifically, the member register certificate L2 is produced by a main key of signature keys SkT4 corresponding to a main key t2 of confirmation keys PkT4 in the fourth period. At this time, the main key t2 and an auxiliary key t1 of the confirmation keys PkT3 are delivered to the user member U.

The foregoing is also applied similarly to member register certificates L1, L2, L3, . . . of the service offerer I and member register certificates L1, L2, L3, . . . of the ticket selling organization B.

Here, however, keys of the ticket selling organization B are also updated according to the key control method of the present invention. A portion with PkB1, PkB2, . . . shown beside the ticket selling organization B in FIG. 14 represents this. The ticket selling organization B sends confirmation keys in the form of a main key and an auxiliary key to the member register organization T to request issuance of a member register certificate.

Now, authentication between the user member U and the service offerer I will be described.

The member register certificate L2 of the user member U has issued with the signature key t1. Since the service offerer I has acquired the main key t1 and the auxiliary key t2 upon issuance of its member register certificate L2 having an effective term overlapping with the member register certificate L2 of the user member U, the member register certificate L1 of the user member U can be confirmed with the main key t1. On the other hand, since the service offerer I has acquired the main key t2 and the auxiliary key t1 upon issuance of its member register certificate L2, the signature contents of the member register certificate L1 of the user member U can be confirmed with the auxiliary key t1.

Similarly, since the user member U has acquired the main key t1 and the auxiliary key t2 upon issuance of its member register certificate L1, the member register certificate L1 of the service offerer I produced with the main key t1 or the member register certificate L2 produced with the main key t2 can be confirmed. On the other hand, since the user member U has acquired the main key t2 and the auxiliary key t1 upon issuance of its member register certificate L2, the member register certificate L2 of the service offerer I can be confirmed with the main key t2.

Confirmation can be similarly carried out between the service offerer I and the ticket selling organization B and between the user member U and the ticket selling organization B.

As described above, the issuance of the member register certificate can be carried out anytime and, as long as the mutual member register certificates L are effective, the counterpart member register certificates L can be confirmed anytime in any combination thereof between the service offerer I and the ticket selling organization B, between the user member U and the ticket selling organization B and between the user member U and the service offerer I, using the keys (PkTn) held by themselves.

Now, the ticket signature information F will be described in more detail.

It is assumed that the ticket selling organization B performs the key updating in order of the confirmation keys PkB1, PkB2, . . . . Specifically, it carries out the key updating according to the same rule wherein the foregoing member register organization T updates the confirmation keys PkT1, PkT2, . . . .

The service offerer I registers the service offer guarantee information C at the ticket selling organization B. Upon such a registration, the service offerer I obtains the main key and the auxiliary key of the ticket selling organization B. It is assumed that effective terms of the service offer guarantee information C and the ticket signature information F are set to, for example, one year.

When the user member U purchases a ticket, the ticket selling organization B produces ticket signature information F1 using a signature key corresponding to a main key b1 of confirmation keys PkB3. On the other hand, the service offerer I has acquired either of confirmation keys PkB2 and the confirmation keys PkB3 of the ticket selling organization B upon registering the service offer guarantee information C at the ticket selling organization B (because the effective term of the service offer guarantee information C is one year). There may also be a chance that the service offerer I has acquired confirmation keys PkB4 before the user member U uses the ticket signature information F1. In any case, the service offerer I has any of the confirmation keys PkB2, PkB3 and PkB4 when the user member U uses the ticket signature information F1 and, since b1 is included in either of a main key or an auxiliary key thereof, the signature can be confirmed.

Now, the second example where the user member U purchases a ticket will be cited. In this case, the ticket selling organization B produces ticket signature information F2 using a signature key corresponding to a main key b2 of the confirmation keys PkB4. On the other hand, the service offerer I has acquired either of confirmation keys PkB3 and the confirmation keys PkB4 of the ticket selling organization B upon registering the service offer guarantee information C at the ticket selling organization B. There may also be a chance that the service offerer I has acquired confirmation keys PkB5 before the user member U uses the ticket signature information F1. In any case, the service offerer I has any of the confirmation keys PkB3, PkB4 and PkB5 when the user member U uses the ticket signature information F1 and, since b2 is included in either of a main key or an auxiliary key thereof, the signature can be confirmed.

As described above, by updating the signature keys of the ticket selling organization B, the service offerer I can confirm anytime the signature F issued by the ticket selling organization B relative to the user member U.

INDUSTRIAL APPLICABILITY

According to the present invention, a plurality of keys to be used as signature keys are prepared and updated according to a given rule, and confirmation keys are updated synchronously with updating the signature keys and made public. Thus, it is not necessary to stop issuance of the electronic signature upon updating, or limit the service utilization after the key updating.

Further, it is not necessary to obtain a key through on-line or acquire a public key certificate upon authentication.

Moreover, it is possible to carry out through off-line mutual authentication of electronic signatures issued at different times.

What is claimed is:

1. An electronic signature key control method comprising preparing a plurality of keys whose contents are updated periodically at mutually different times; and alternately switching the plurality of keys per switching cycle shorter than an updating cycle of each key to use one of the keys switched as a signature key for electronic signature.

2. A key control method comprising dividing an updating period of each of a plurality of keys, whose contents are updated periodically at mutually different times, into three periods; setting first and third divided periods as preliminary periods and an intermediate divided period as a use period for using as a signature key for electronic signature; and switching the use periods of the respective keys so as to continue in time with each other but not to overlap with each other.

3. An electronic signature key control method comprising preparing a first key updated periodically and a second key updated periodically at different times as compared with said first key; using either of said first and second keys as a signature key for electronic signature by alternately switching them per switching cycle shorter than an updating cycle of each key;

making public in pair a third key which is updated synchronously with an updating time of said first key and becomes a confirmation key when said first key is the signature key, and a fourth key which is updated synchronously with an updating time of said second key and becomes a confirmation key when said second key is the signature key; and offering said third and fourth keys for confirming the electronic signature.

4. An electronic signature key control method comprising:

preparing M, wherein M represents a natural number greater than one, signature keys updated periodically at mutually different times, and making public corresponding M confirmation keys at the same time, said M confirmation keys updated synchronously with updating times of said signature keys, respectively;

executing an electronic signature with respect to given signature object data by switching said prepared M signature keys per cycle shorter than an updating cycle of the corresponding signature key in a given order; and confirming said electronic signature using one of the M confirmation keys made public.

5. An electronic signature key control system comprising key holding means for holding a plurality of keys to be used as signature keys for electronic signature; key updating means for cyclically updating the contents of said plurality of keys at mutually different times; key switching means for alternately switching said plurality of keys per switching cycle shorter than an updating cycle of each key; and signature means for reading out the key, switched by said key switching means, from said key holding means according to a given rule, and executing an electronic signature with respect to given signature object data using the read-out key as the signature key.

6. An electronic signature key control system comprising key holding means for holding a first key and a second key which are used as signature keys for electronic signature; key updating means for updating the contents of said first key and said second key in the same cycle at mutually different times; key switching means for alternately switching said first key and said second key per switching cycle shorter than an updating cycle of each key; and signature means for reading out the key, switched by said key switching means, from said key holding means according to a given rule, and executing an electronic signature with respect to given signature object data using the read-out first or second key as the signature key.

7. An electronic signature authentication system comprising signature receiving means for receiving an electronic signature produced with one of M, wherein M represents a natural number greater than one, signature keys which are updated at mutually different times, and corresponding M confirmation keys which are updated synchronously with updating the M signature keys including the signature key used for said electronic signature; and signature confirming means for confirming said received electronic signature with one of said M confirmation keys, wherein the electronic signature confirmed by said signature confirming means is judged to be legitimate.

8. An electronic signature authentication system comprising signature receiving means for receiving a plurality of electronic signatures produced with signature keys, updated at different times, of M, wherein M represents a natural number greater than one, signature keys, and M confirmation keys which are updated synchronously with updating the M signature keys including the signature keys used for said electronic signatures; and signature confirming means for confirming said received electronic signatures with one of said M confirmation keys, wherein the electronic signature confirmed by said signature confirming means is judged to be legitimate.

9. An electronic signature key control system comprising key holding means for holding a first key and a second key which are used as signature keys for electronic signature; key updating means for updating the contents of said first key and said second key in the same cycle at mutually different times; signature means for reading out the key, whose contents were updated by said key updating means, from said key holding means according to a given rule, and executing an electronic signature with respect to given signature object data using the read-out first or second key as the signature key; and key holding means for holding a third key which is updated synchronously with said first key and becomes a confirmation key when said first key is the signature key, and a fourth key which is updated synchronously with said second key and becomes a confirmation key when said second key is the signature key, wherein when the electronic signature is carried out using said first or second key, said third and fourth keys are made public at the same time.

10. An electronic signature key control system comprising key holding means for holding a first key and a second key which are used as signature keys for electronic signature; key updating means for updating the contents of said first key and said second key in the same cycle at mutually different times; and signature means for reading out the key, whose contents were updated by said key updating means, from said key holding means according to a given rule, and executing an electronic signature with respect to given signature object data using the read-out first or second key as the signature key, wherein said key updating means divides said updating cycle into three periods, and each key is switched per time period shorter than the updating cycle of the corresponding key.

11. An electronic signature key control system comprising key holding means for holding a plurality of keys to be used as signature keys for electronic signature; a key updating means for cyclically updating the contents of said plurality of keys at mutually different times; and signature means for reading out the key, whose contents were updated by said key updating means, from said key holding means according to a given rule, and executing an electronic signature with respect to given signature object data using the read-out key as the signature key, wherein said key updating means divides said updating cycle into three periods, and each key is switched per time period shorter than the updating cycle of the corresponding key.

12. An electronic signature key control system comprising key holding means for holding a plurality of keys to be used as signature keys for electronic signature; key updating means for cyclically updating the contents of said plurality of keys at mutually different times, said key updating means dividing said updating cycle into three periods; and signature means for reading out the key, whose contents were updated by said key updating means, from said key holding means according to a given rule, and executing an electronic signature with respect to given signature object data using the read-out key as the signature key; wherein said key updating means comprises a mode selecting means for selectively applying a first mode for transferring the key contents of one of the divided periods to a subsequent divided period and a second mode for exchanging the key contents mutually upon shifting from a prior divided period to a subsequent divided period, and updates, during applying said first mode to one of the keys, the key contents of another key.

13. An electronic signature key control system comprising key holding means for holding a first key and a second key which are used as signature keys for electronic signature; key updating means for updating the contents of said first key and said second key in the same cycle at mutually different times, said key updating means dividing said updating cycle into three periods; and signature means for reading out the key, whose contents were updated by said key updating means, from said key holding means according to a given rule, and executing an electronic signature with respect to given signature object data using the read-out first or second key as the signature key; wherein said key updating means comprises a mode selecting means for selectively applying a first mode for transferring the key contents of one of the divided periods to a subsequent divided period and a second mode for exchanging the key contents mutually upon shifting from a prior divided period to a subsequent divided period, and updates, during applying said first mode to one of the keys, the key contents of another key.

14. An electronic signature key control system comprising key holding means for holding a plurality of keys to be used as signature keys for electronic signature; key updating means for cyclically updating the contents of said plurality of keys at mutually different times, said key updating means dividing said updating cycle into three periods; and signature means for reading out the key, whose contents were updated by said key updating means, from said key holding means according to a given rule, and executing an electronic signature with respect to given signature object data using the read-out key as the signature key; wherein said signature means uses each of said keys as the signature key during a period from the termination of a first period, after updating, of said divided periods to the start of a last period of said divided periods.

15. An electronic signature key control system comprising key holding means for holding a first key and a second key which are used as signature keys for electronic signature; key updating means for updating the contents of said first key and said second key in the same cycle at mutually different times, said key updating means dividing said updating cycle into three periods; and signature means for reading out the key, whose contents were updated by said key updating means, from said key holding means according to a given rule, and executing an electronic signature with respect to given signature object data using the read-out first or second key as the signature key; wherein said signature means uses each of said keys as the signature key during a period from the termination of a first period, after updating, of said divided periods to the start of a last period of said divided periods.

16. The key control method according to claim 1, further comprising said switching cycles are set to the same time length with respect to all the keys.

17. The key control method according to claim 1 or 2, further comprising despite said switching, each of said keys can be used as the signature key.

18. The key control method according to claim 1, 2 or 3, further comprising said updating cycle is set to no longer than a time period derived by subtracting an effective term of an electronic signature produced based on the corresponding key from an average time over which security of the corresponding key can be ensured.

19. The key control method according to claim 2, further comprising an effective term of an electronic signature based on said signature key is equal to or shorter than a period which is the shorter of the first divided period and the last divided period.

20. The key control method according to claim 2, further comprising the sum of the first and last divided periods is set equal in time length to said intermediate divided period with respect to each key.

21. The key control method according to claim 2, further comprising the first divided period and the last divided period are set equal in time length to each other with respect to each key.

22. The key control method according to claim 2, further comprising the last divided period of one of the keys and the first divided period of another key are set equal in time length to each other.

23. The key control method according to claim 2, further comprising in the use period of one of the keys, another key is updated, and the use period of said updated another key is started at a time point of the termination of the use period of said one of the keys.

24. The key control method according to claim 3, further comprising a use termination time is added to each of said third and fourth keys.

25. The key control system according to claim 5 or 6, further comprising said key updating means divides said updating cycle into three periods, and each key is switched per time period shorter than the updating cycle of the corresponding key.

26. The key control system according to claim 25, further comprising said key updating means comprises mode selecting means for selectively applying a first mode for transferring the key contents of one of the divided periods to a subsequent divided period and a second mode for exchanging the key contents mutually upon shifting from a prior divided period to a subsequent divided period, and updates, during applying said first mode to one of the keys, the key contents of another key.

27. The key control system according to claim 25, further comprising said signature means uses each of said keys as the signature key during a period from the termination of a first period, after updating, of said divided periods to the start of a last period of said divided periods.

28. The key control system according to claim 5 or 6, further comprising when said electronic signature is used for member authentication between members, said signature means includes, in said signature object data, an effective term of said electronic signature and personal information including a signature confirmation key of the corresponding member and executes said electronic signature.

29. The key control system according to claim 5 or 6, further comprising when said electronic signature is used for authenticating an electronic ticket usable between members, said signature means includes, in said signature object data, information for identifying a service corresponding to said electronic ticket and a signature confirmation key of the member and executes said electronic signature.

30. The key control system according to claim 6, further comprising key holding means for holding a third key which is updated synchronously with said first key and becomes a confirmation key when said first key is the signature key, and a fourth key which is updated synchronously with said second key and becomes a confirmation key when said second key is the signature key, wherein when the electronic signature is carried out using said first or second key, said third and fourth keys are made public at the same time.

31. The key control system according to claim 29, further comprising consecutive number information managed by a subject offering service information based on said electronic ticket is further included in said signature object data.

32. The key control system according to claim 10, further comprising said key updating means comprises mode selecting means for selectively applying a first mode for transferring the key contents of one of the divided periods to a subsequent divided period and a second mode for exchanging the key contents mutually upon shifting from a prior divided period to a subsequent divided period, and updates, during applying said first mode to one of the keys, the key contents of another key.

33. The key control system according to claim 10, further comprising said signature means uses each of said keys as the signature key during a period from the termination of a first period, after updating, of said divided periods to start of a last period of said divided periods.

34. The key control system according to claim 10, further comprising when said electronic signature is used for member authentication between members, said signature means includes, in said signature object data, an effective term of said electronic signature and personal information including a signature confirmation key of the corresponding member and executes said electronic signature.

35. The key control system according to claim 10, further comprising when said electronic signature is used for authenticating an electronic ticket usable between members, said signature means includes, in said signature object data, information for identifying a service corresponding to said electronic ticket and a signature confirmation key of the member and executes said electronic signature.

36. The key control system according to claim 35, further comprising consecutive number information managed by a subject offering service information based on said electronic ticket is further included in said signature object data.

37. The key control system according to claim 11, further comprising said key updating means comprises mode selecting means for selectively applying a first mode for transferring the key contents of one of the divided periods to a subsequent divided period and a second mode for exchanging the key contents mutually upon shifting from a prior divided period to a subsequent divided period, and updates, during applying said first mode to one of the keys, the key contents of another key.

38. The key control system according to claim 11, further comprising said signature means uses each of said keys as the signature key during a period from the termination of a first period, after updating, of said divided periods to start of a last period of said divided periods.

39. The key control system according to claim 11, further comprising when said electronic signature is used for member authentication between members, said signature means includes, in said signature object data, an effective term of said electronic signature and personal information including a signature confirmation key of the corresponding member and executes said electronic signature.

40. The key control system according to claim 11, further comprising when said electronic signature is used for authenticating an electronic ticket usable between members, said signature means includes, in said signature object data, information for identifying a service corresponding to said electronic ticket and a signature confirmation key of the member and executes said electronic signature.

41. The key control system according to claim 40, further comprising consecutive number information managed by a subject offering service information based on said electronic ticket is further included in said signature object data.

42. The key control system according to claim 12, 13, 14 or 15, further comprising when said electronic signature is used for member authentication between members, said signature means includes, in said signature object data, an effective term of said electronic signature and personal information including a signature confirmation key of the corresponding member and executes said electronic signature.

43. The key control system according to claim 12, 13, 14 or 15, further comprising when said electronic signature is used for authenticating an electronic ticket usable between members, said signature means includes, in said signature object data, information for identifying a service corresponding to said electronic ticket and a signature confirmation key of the member and executes said electronic signature.

44. The key control system according to claim 43, further comprising consecutive number information managed by a subject offering service information based on said electronic ticket is further included in said signature object data.

45. The electronic signature authentication system according to claim 23, wherein said M signature keys and M confirmation keys are possessed by a given system which produces an electronic signature using one of said M signature keys, and said given system supplies said M confirmation keys to said signature receiving means.

46. The key control system according to claim 9, further comprising when said electronic signature is used for member authentication between members, said signature means includes, in said signature object data, an effective term of said electronic signature and personal information including a signature confirmation key of the corresponding member and executes said electronic signature.

47. The key control system according to claim 9, further comprising when said electronic signature is used for authenticating an electronic ticket usable between members, said signature means includes, in said signature object data, information for identifying a service corresponding to said electronic ticket and a signature confirmation key of the member and executes said electronic signature.

48. The key control system according to claim 47, further comprising consecutive number information managed by a subject offering service information based on said electronic ticket is further included in said signature object data.

* * * * *

UNITED STATES PATENT AND TRADEMARK OFFICE
CERTIFICATE OF CORRECTION

PATENT NO. : 6,377,692 B1
DATED : April 23, 2002
INVENTOR(S) : Yoshio Takahashi and Hidemi Moribatake It is certified that error appears in the above-identified patent and that said Letters Patent is hereby corrected as shown below:

Column 3,
Line 4, "Immediately" should read -- immediately --.

Column 24,
Line 4, "claim 23" should read -- claim 7 --.

Signed and Sealed this

Twenty-fourth Day of September, 2002

Attest:

JAMES E. ROGAN
Attesting Officer
Director of the United States Patent and Trademark Office